US010033481B2

(12) United States Patent
Nagasaka et al.

(10) Patent No.: US 10,033,481 B2
(45) Date of Patent: Jul. 24, 2018

(54) MULTIPLEXING COMMUNICATION SYSTEM AND SUBSTRATE WORKING MACHINE

(71) Applicant: FUJI MACHINE MFG. CO., LTD., Chiryu (JP)

(72) Inventors: Nobuo Nagasaka, Okazaki (JP); Yasuaki Imadera, Chiryu (JP); Naomichi Ishiura, Okazaki (JP); Shigemoto Hirota, Nagoya (JP)

(73) Assignee: FUJI MACHINE MFG. CO., LTD., Chiryu (JP)

( * ) Notice: Subject to any disclaimer, the term of this patent is extended or adjusted under 35 U.S.C. 154(b) by 66 days.

(21) Appl. No.: 15/028,236

(22) PCT Filed: Oct. 11, 2013

(86) PCT No.: PCT/JP2013/077849
§ 371 (c)(1),
(2) Date: Apr. 8, 2016

(87) PCT Pub. No.: WO2015/052843
PCT Pub. Date: Apr. 16, 2015

(65) Prior Publication Data
US 2016/0261373 A1 Sep. 8, 2016

(51) Int. Cl.
*H04L 1/00* (2006.01)
*H04J 3/16* (2006.01)
(Continued)

(52) U.S. Cl.
CPC .......... *H04L 1/0045* (2013.01); *H04J 3/1652* (2013.01); *H04J 3/1694* (2013.01);
(Continued)

(58) Field of Classification Search
CPC ....... H04L 1/0045; H04L 1/007; H04J 3/1694
See application file for complete search history.

(56) References Cited

U.S. PATENT DOCUMENTS 6,006,353 A * 12/1999 Inoue .................... H04L 1/0057
714/712
6,324,667 B1 * 11/2001 Sugaya .................. H04L 1/004
714/746

(Continued)

FOREIGN PATENT DOCUMENTS

EP   2 790 369 A1   10/2014
JP   63-117528 A    5/1988
(Continued)

OTHER PUBLICATIONS

Office Action dated Jun. 26, 2017 in Japanese Patent Application No. 2015-541411 (with unedited computer generated English translation).

(Continued)

*Primary Examiner* — Elmira Mehrmanesh
(74) *Attorney, Agent, or Firm* — Oblon, McClelland, Maier & Neustadt, L.L.P.

(57) ABSTRACT

A multiplexing communication system is provided in which, even in a case where communication uses a multiplex data string in which multiple types of pieces of data that are different in error processing by a multiplexing communication system and a substrate working machine are present mixedly, it is possible to perform the error processing suitable for every type of data.

A transmission data composition processing section at a transmitting side performs setting processing for error detection in accordance with a data transfer rate and a data processing time for each of the multiple types of pieces of data, and then multiplexes these pieces of data using a multiplexing section, and transmits a result of the multiplexing.

17 Claims, 18 Drawing Sheets

(51) Int. Cl.
*H04L 5/16* (2006.01)
*H04L 29/06* (2006.01)
*H04L 1/18* (2006.01)

(52) U.S. Cl.
CPC .............. *H04L 1/007* (2013.01); *H04L 5/16* (2013.01); *H04L 69/18* (2013.01); *H04B 2201/709709* (2013.01); *H04L 1/0057* (2013.01); *H04L 1/1822* (2013.01)

(56) References Cited

U.S. PATENT DOCUMENTS

| | | | | |
|---|---|---|---|---|
| 6,707,806 B1* | 3/2004 | Kato | ................... | H04W 52/265 |
| | | | | 370/335 |
| 6,826,233 B1* | 11/2004 | Oosawa | ................ | H04L 1/0041 |
| | | | | 375/240.24 |
| 2001/0039190 A1* | 11/2001 | Bhatnagar | ............. | D06F 39/005 |
| | | | | 455/450 |
| 2003/0027363 A1* | 2/2003 | Kodama | ............ | G05B 19/4065 |
| | | | | 438/14 |
| 2007/0220404 A1* | 9/2007 | Terui | ................... | H03M 13/356 |
| | | | | 714/774 |
| 2012/0236324 A1 | 9/2012 | Muraishi | | |

FOREIGN PATENT DOCUMENTS

| | | |
|---|---|---|
| JP | 8-233599 A | 9/1996 |
| JP | 10-178419 A | 6/1998 |
| JP | 3186490 B2 | 7/2001 |
| JP | 2006-197009 A | 7/2006 |
| JP | 2010-161550 A | 7/2010 |
| JP | 2012-210802 A | 11/2012 |
| JP | 2013-81083 A | 5/2013 |
| WO | 2007/132577 A1 | 11/2007 |
| WO | 2013/084327 A1 | 6/2013 |

OTHER PUBLICATIONS

International Search Report dated Jan. 14, 2014 in PCT/JP2013/077849 Filed Oct. 11, 2013.

Extended European Search Report dated May 19, 2017 in European Patent Application No. 13895290.8.

\* cited by examiner

[FIG. 1]
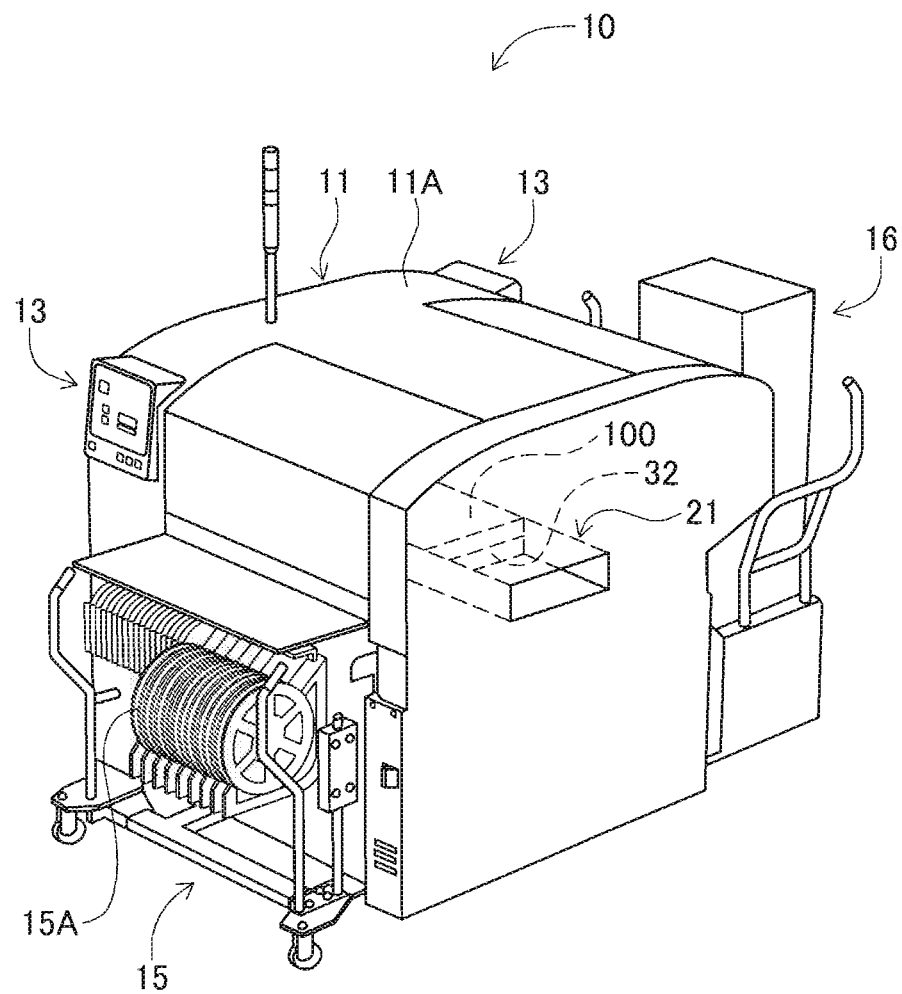
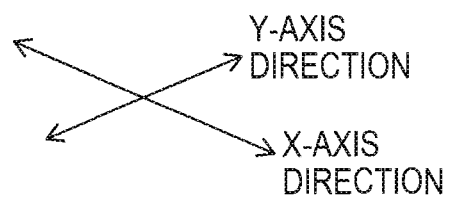

[FIG. 2]
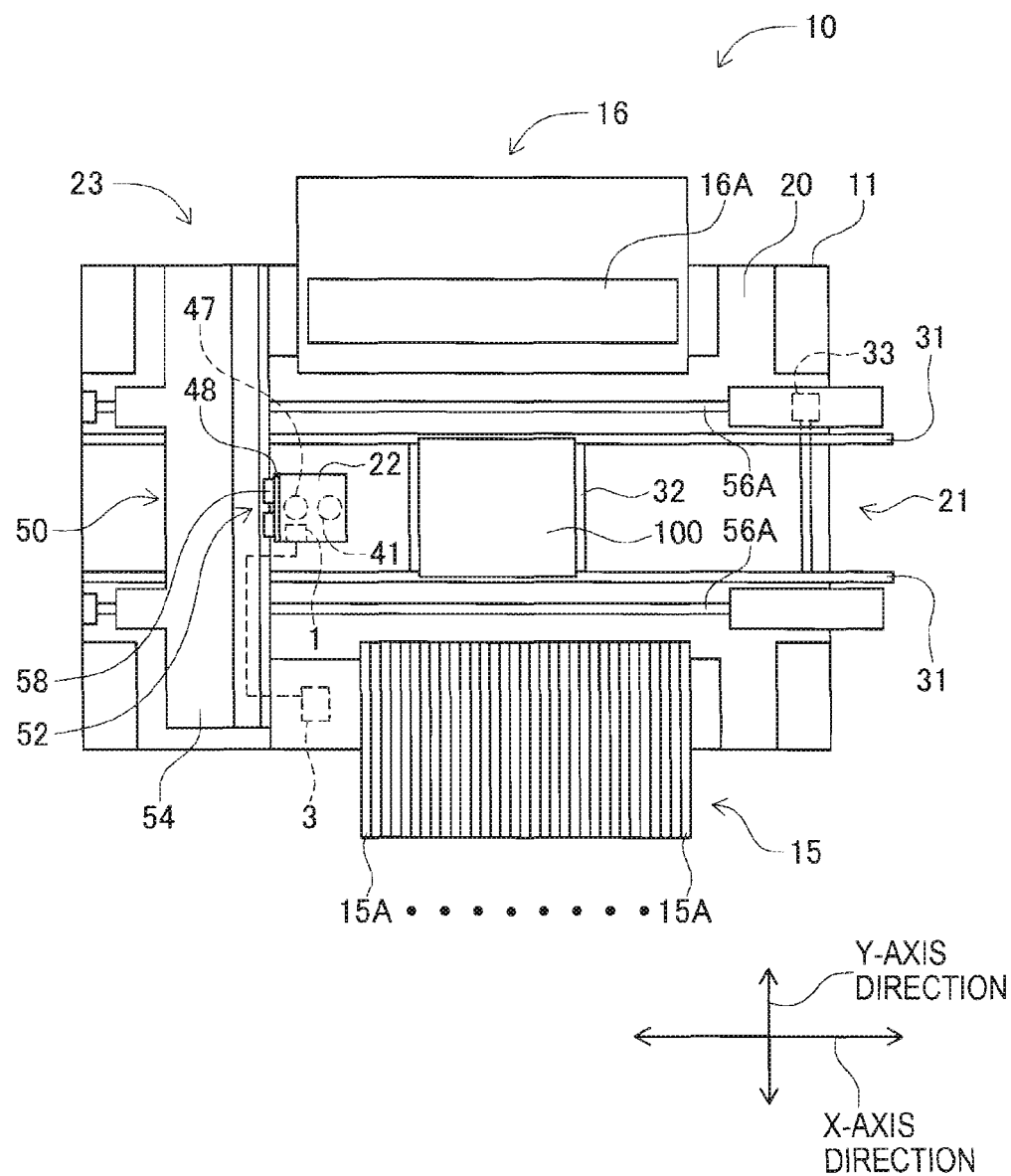

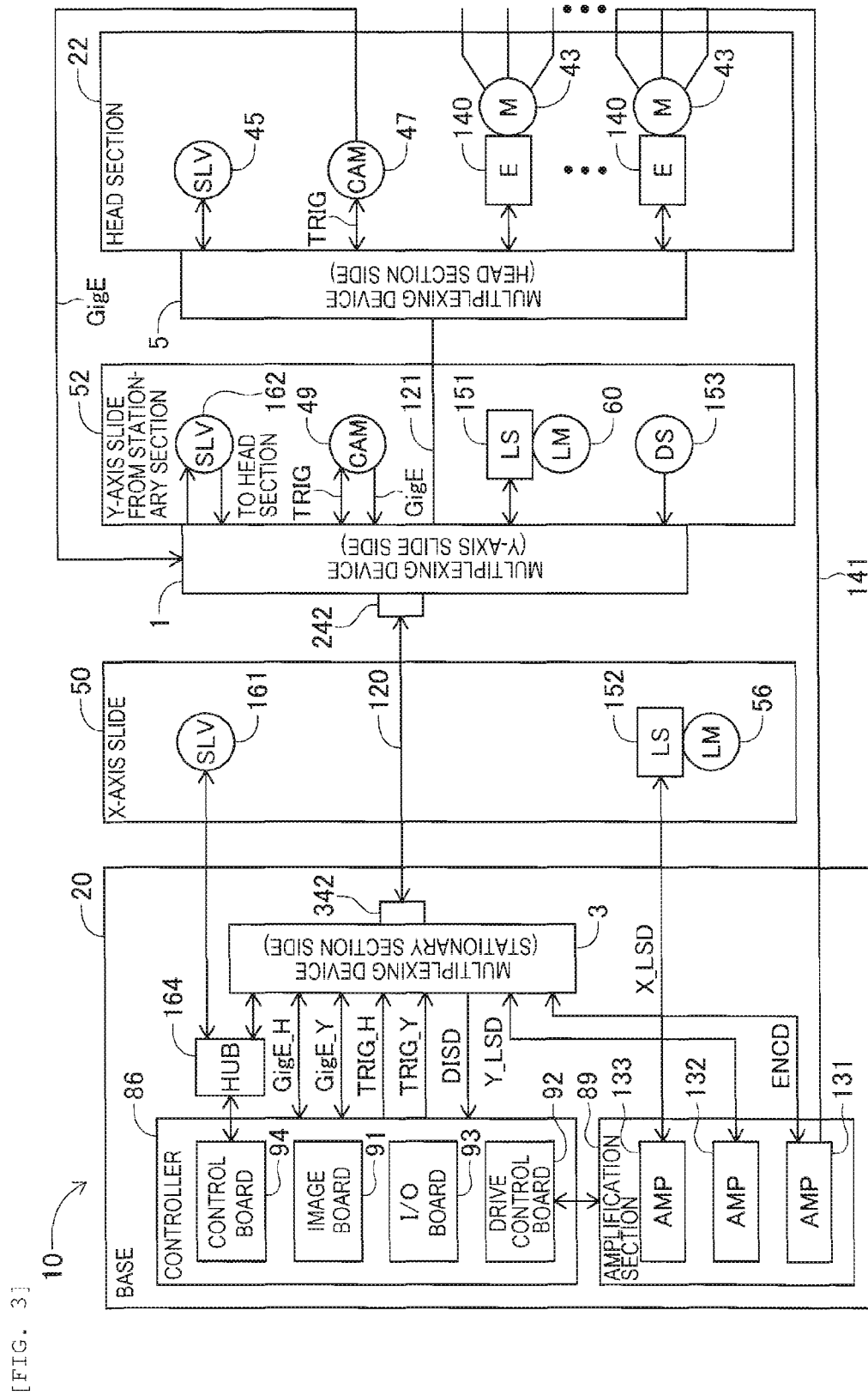

[FIG. 4]

| CLASSIFICATION | TYPE OF DATA | DATA TRANSFER RATE | PERMITTED DELAY TIME | ERROR DETECTION METHOD |
|---|---|---|---|---|
| A (HIGH SPEED) | IMAGE DATA IMGD | 1 Gbps OR MORE HALF-DUPLEX COMMUNICATION | 100 μs TO 1 ms | REED-SOLOMON CODE |
| B (MIDDLE SPEED) | CONTROL DATA CTLD (CONTROL NETWORK) | UP TO 100 Mbps FULL-DUPLEX COMMUNICATION | SEVERAL μs TO 1 ms | HUMMING CODE FEC (15,11) |
| C (LOW SPEED) | ENCODER SIGNAL ENCD (LINEAR TYPE TIME LSD) | UP To 10 Mbps HALF-DUPLEX COMMUNICATION | SEVERAL μs | HUMMING CODE FEC (7,4) |
| C (LOW SPEED) | DISPLACEMENT SENSOR SIGNAL DISD | UP TO 1 Mbps HALF-DUPLEX COMMUNICATION | SEVERAL TENS μs | HUMMING CODE FEC (7,4) |
| D (LOW SPEED) | PARALLEL I/O SIGNAL PIOD | SEVERAL Kbps | SEVERAL μs | VALUES BEING CONSISTENT MULTIPLE TIMES SUCCESSIVELY |

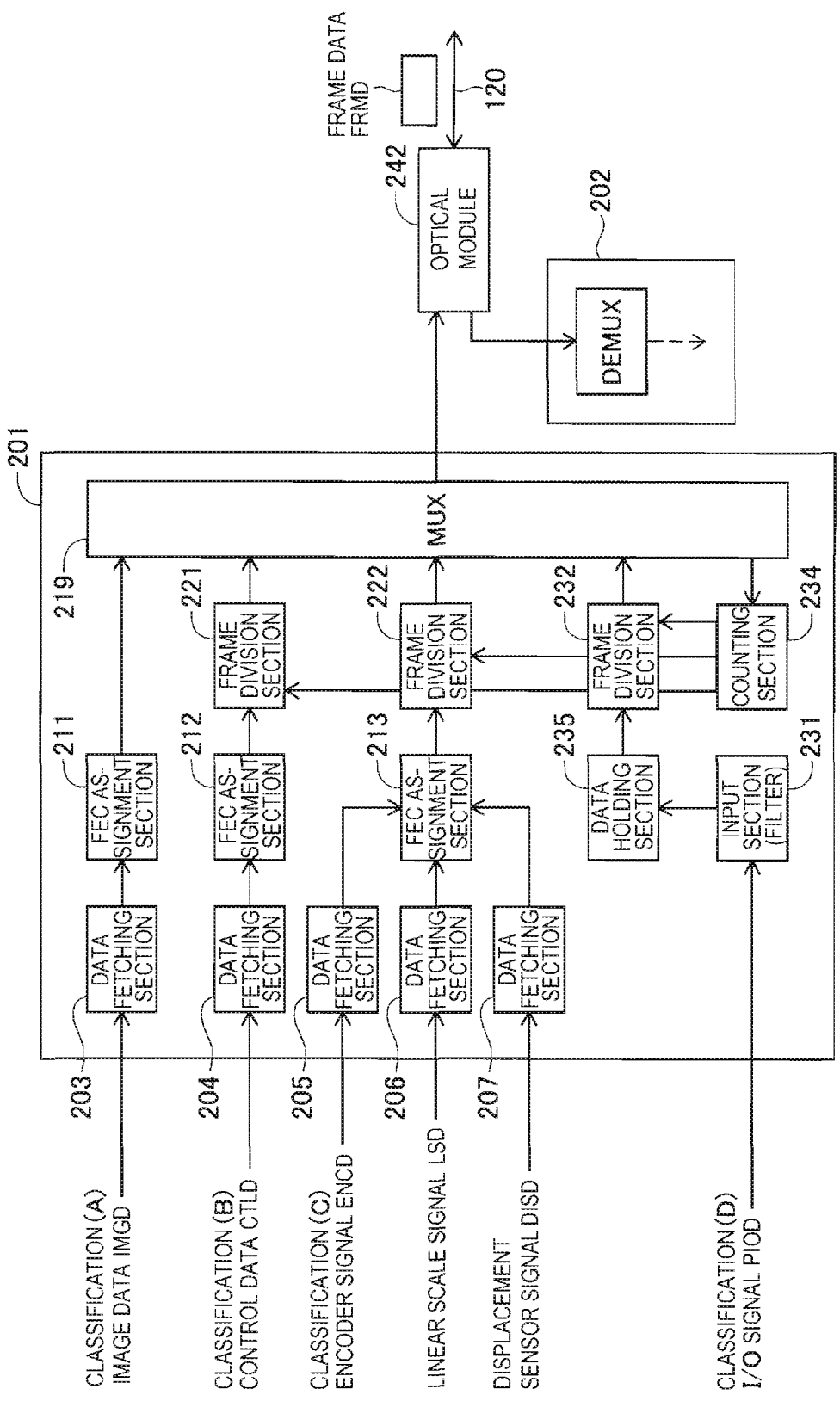
[FIG. 5]

[FIG. 6]
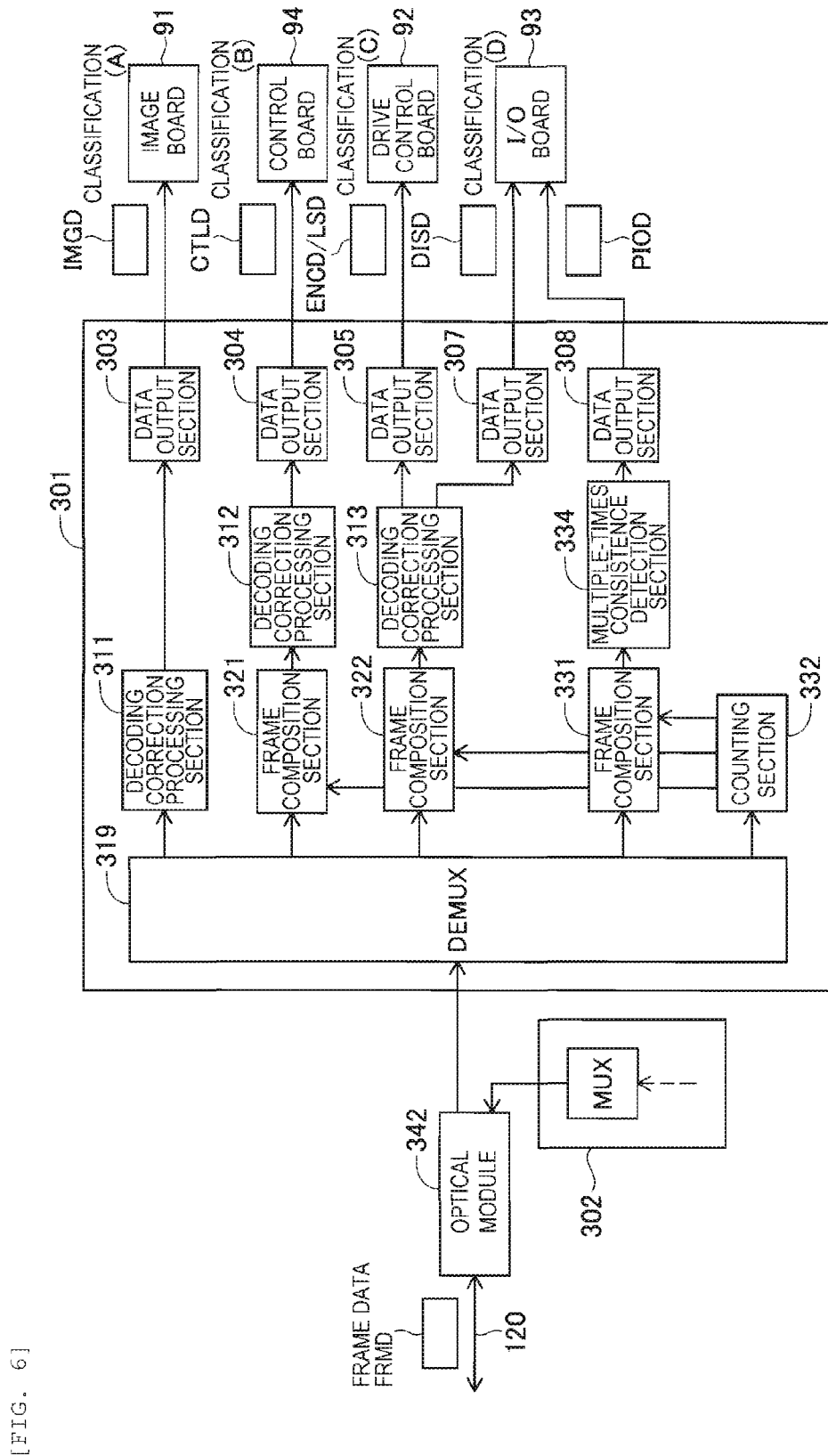

[FIG. 7]

| BIT POSITION | DETAILS OF DATA |
|---|---|
| 0 | HEADER HEADER |
| 1 | |
| 2 | |
| 3 | |
| 4 | |
| 5 | |
| 6 | |
| 7 | |
| 8 | |
| 9 | |
| 10 | DC BALANCE BIT |
| 11 | DC BALANCE BIT |
| 12 | IMAGE DATA IMGD THAT IS OBTAINED BY PARTS CAMERA |
| 13 | |
| 14 | |
| 15 | |
| 16 | |
| 17 | |
| 18 | |
| 19 | |
| 20 | DC BALANCE BIT |
| 21 | DC BALANCE BIT |
| 22 | IMAGE DATA IMGD THAT IS OBTAINED BY MARK CAMERA |
| 23 | |
| 24 | |
| 25 | |
| 26 | |
| 27 | |
| 28 | |
| 29 | |
| 30 | DC BALANCE BIT |
| 31 | DC BALANCE BIT |
| 32 | PARALLEL I/O SIGNAL PIOD (HEAD) |
| 33 | PARALLEL I/O SIGNAL PIOD (Y-AXIS) |
| 34 | CONTROL DATA CTLD |
| 35 | CONTROL DATA CTLD |
| 36 | ENCODER SIGNAL ENCD |
| 37 | ENCODER SIGNAL ENCD |
| 38 | ENCODER SIGNAL ENCD |
| 39 | DISPLACEMENT SENSOR SIGNAL DISD OR LINEAR SCALE SIGNAL LSD |

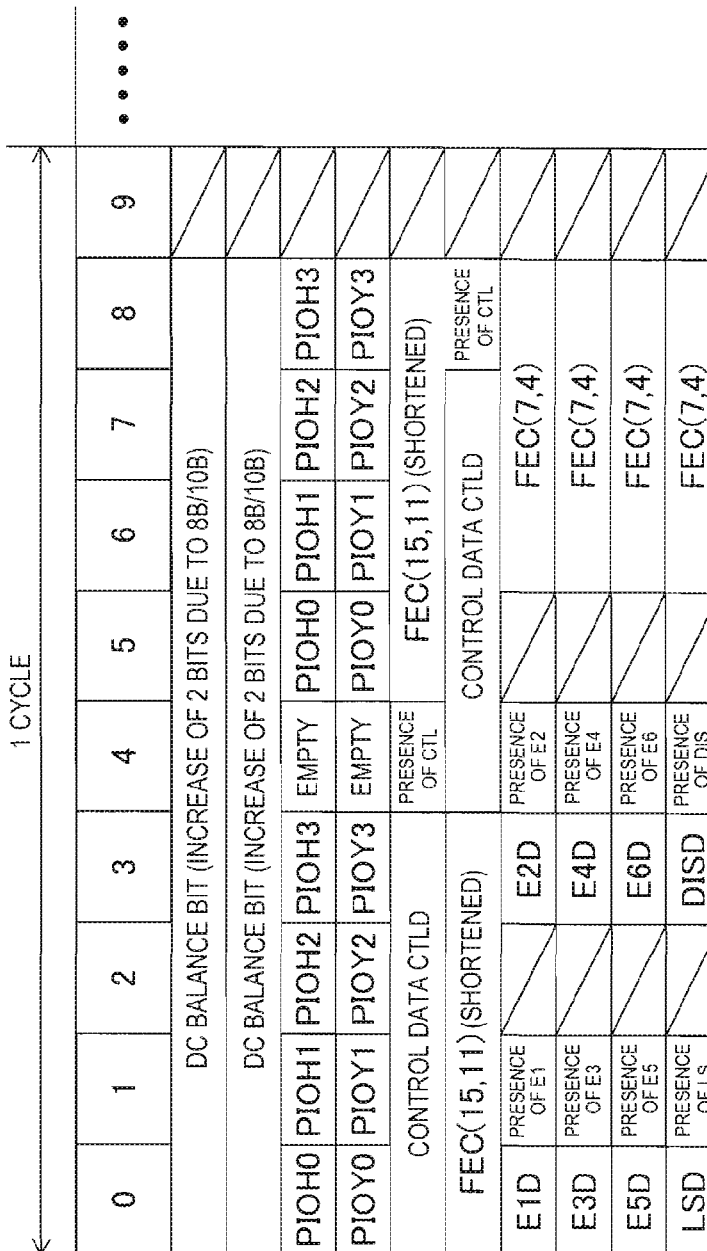
[FIG. 8]

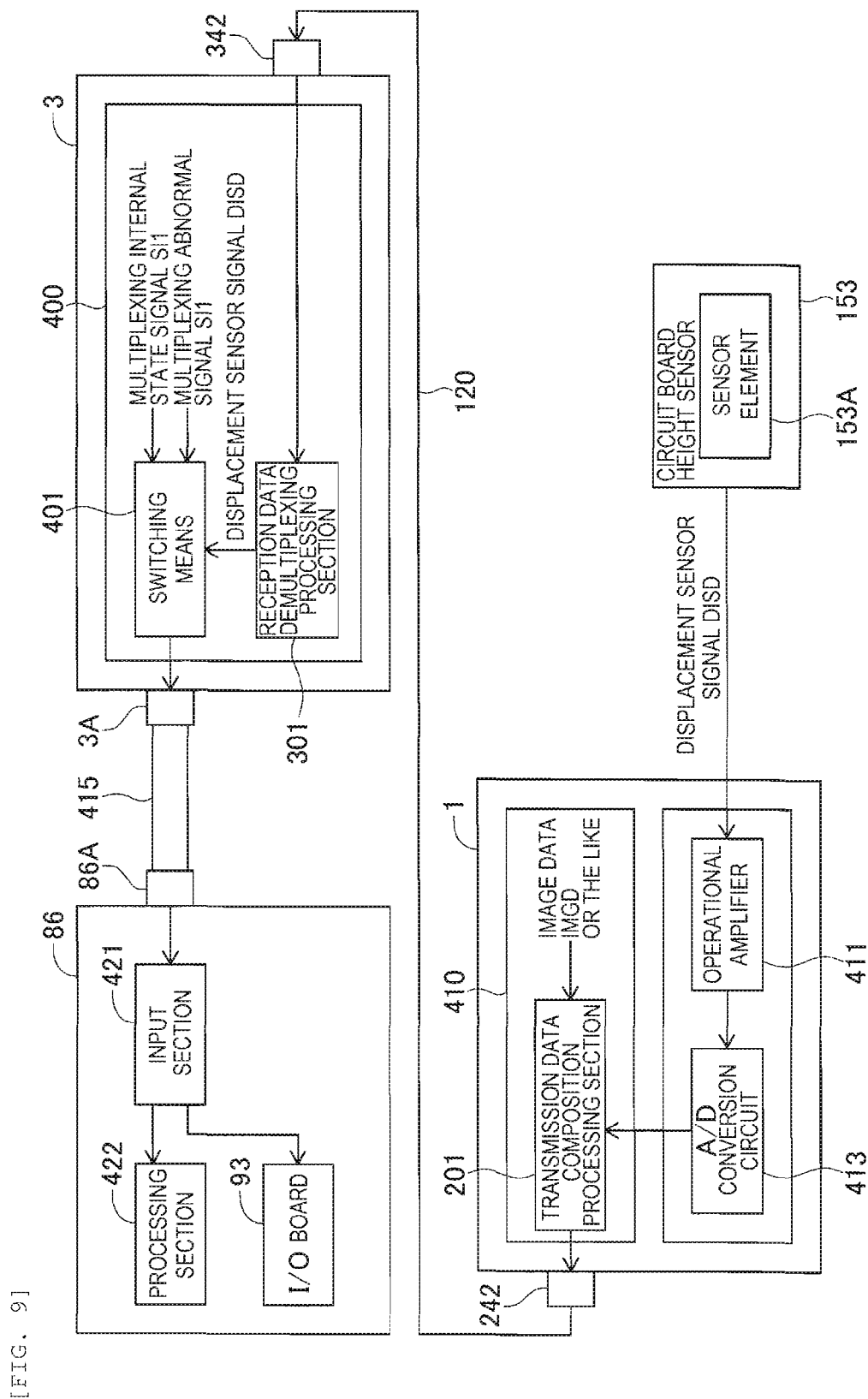
[FIG. 9]

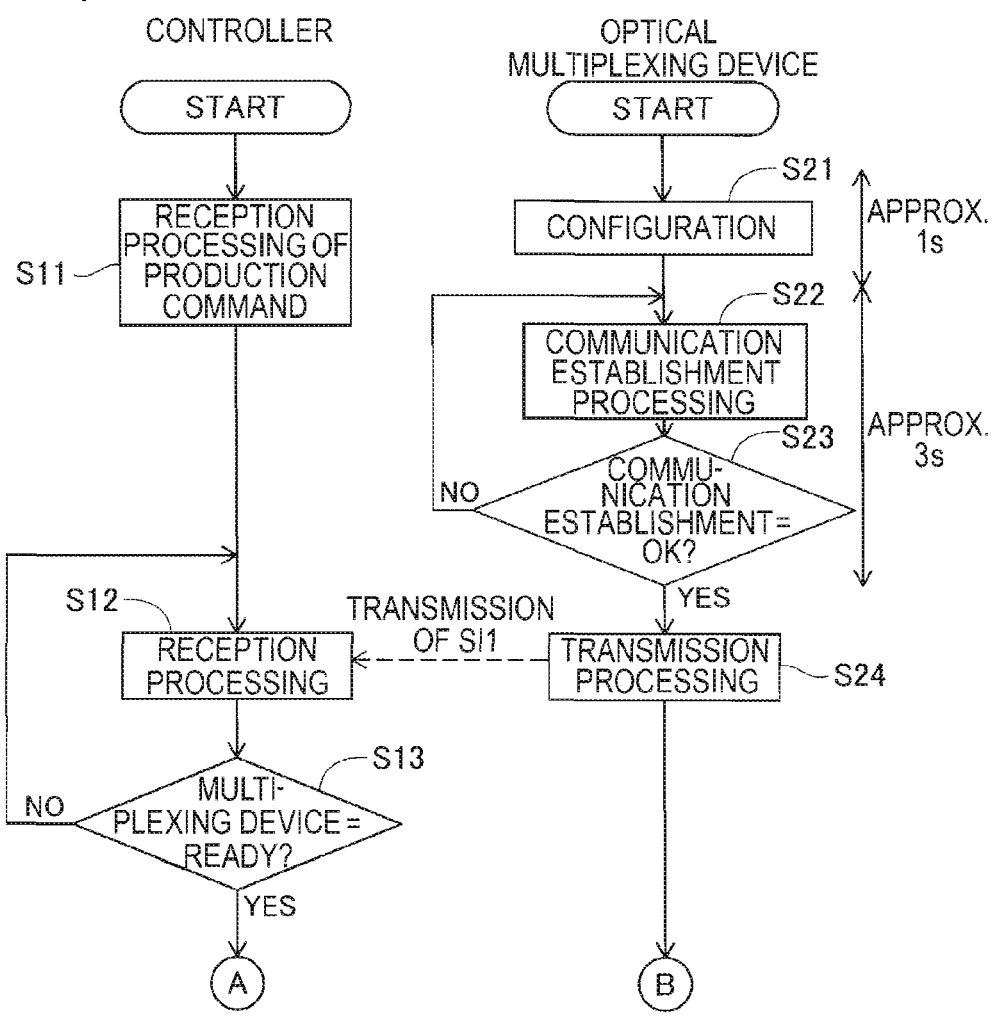
[FIG. 10]

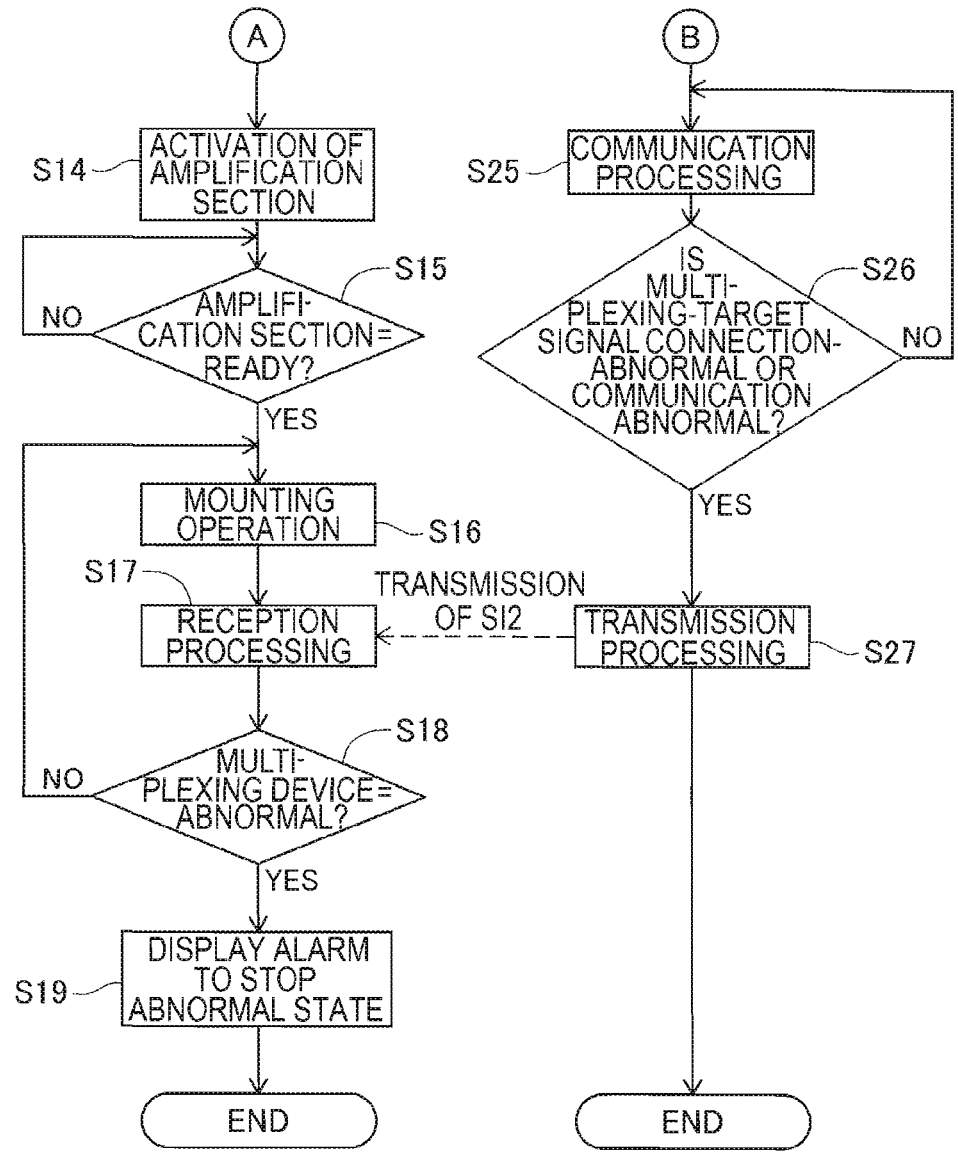
[FIG. 11]

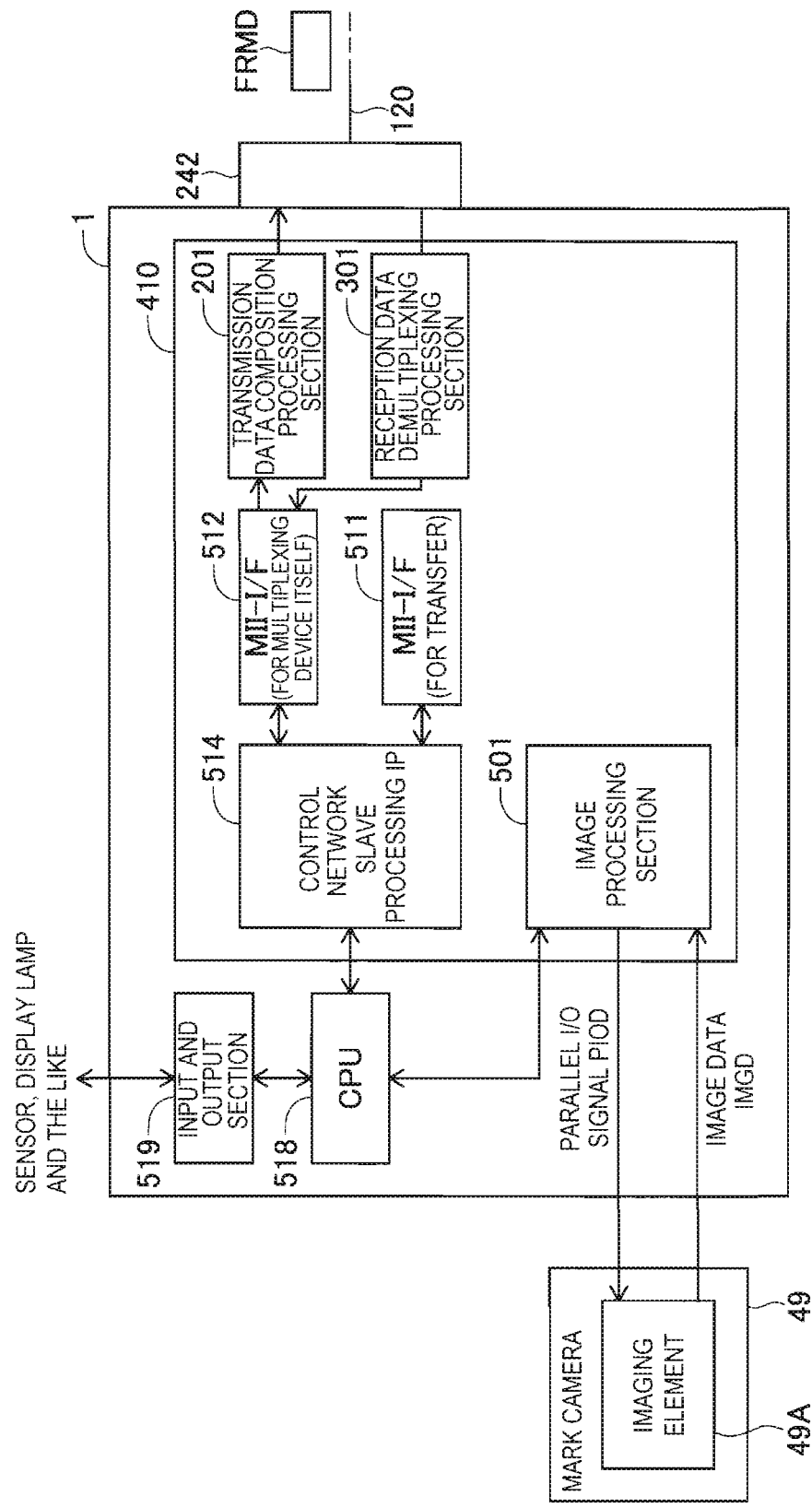
[FIG. 12]

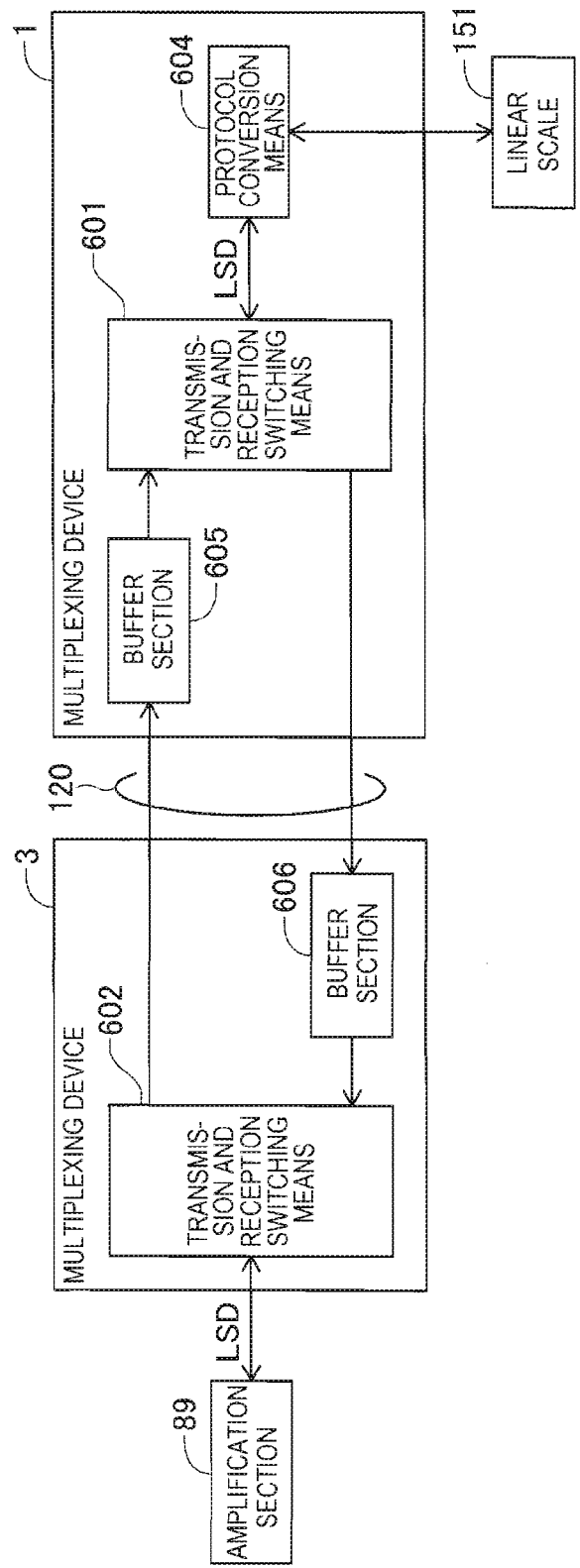
[FIG. 13]

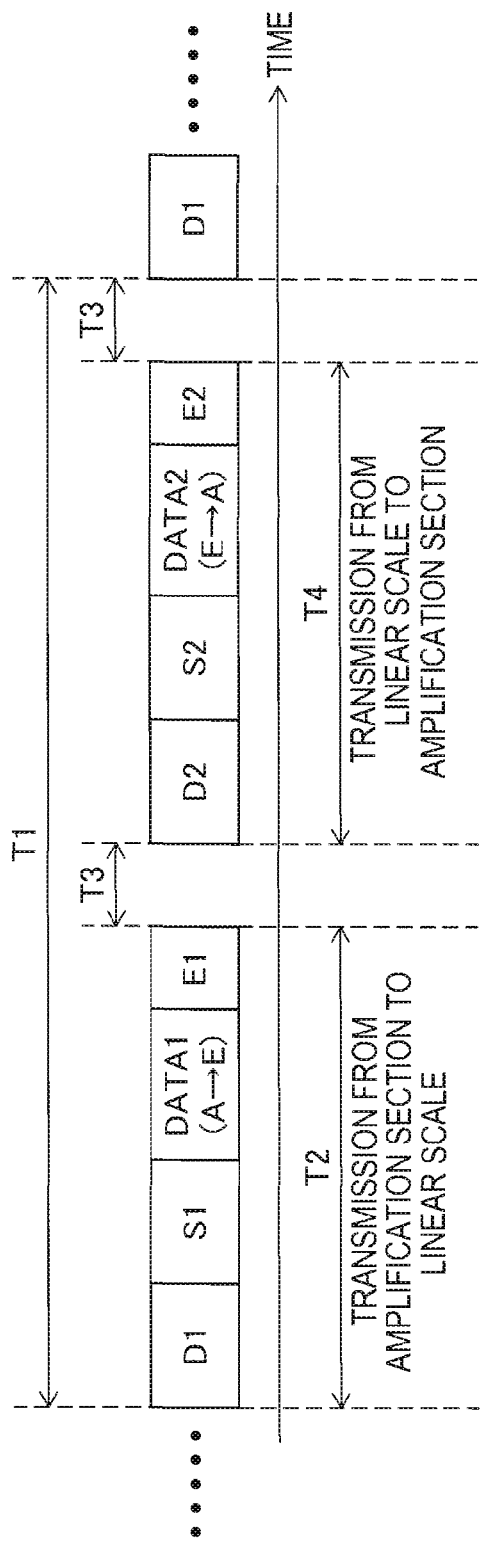
[FIG. 14]

[FIG. 15]
<BEFORE CHANGE>
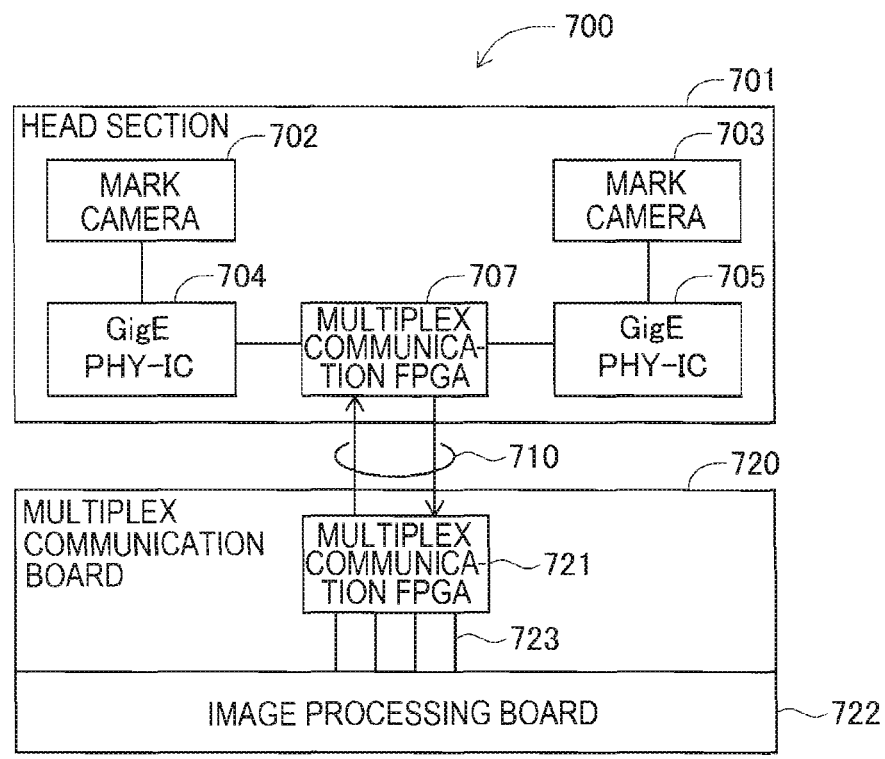

[FIG. 16]
<AFTER CHANGE>
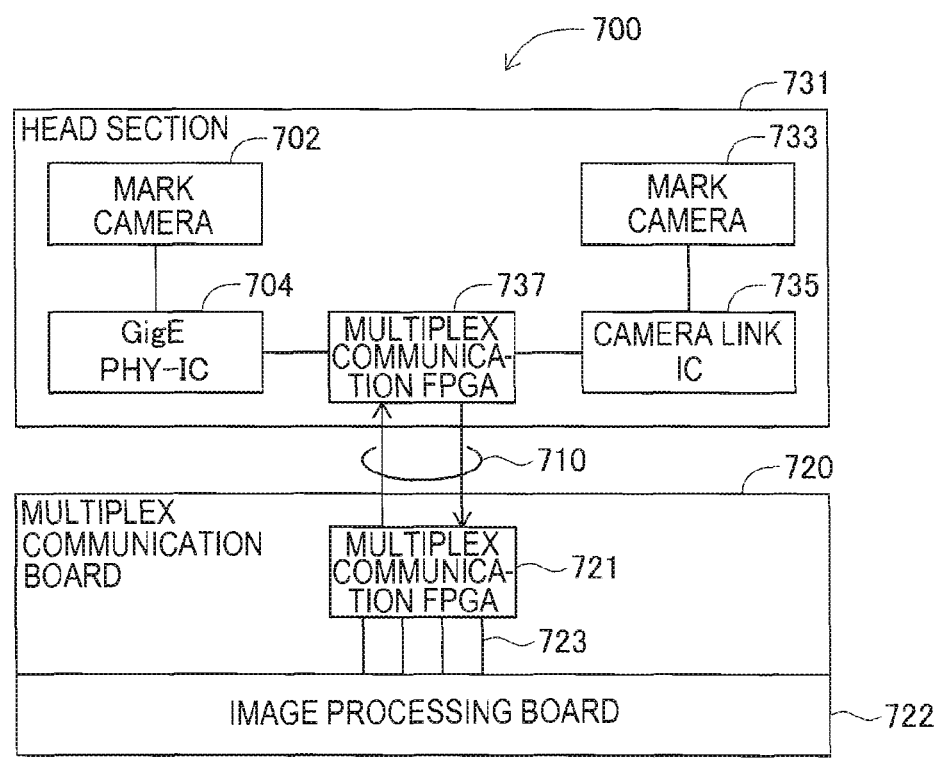

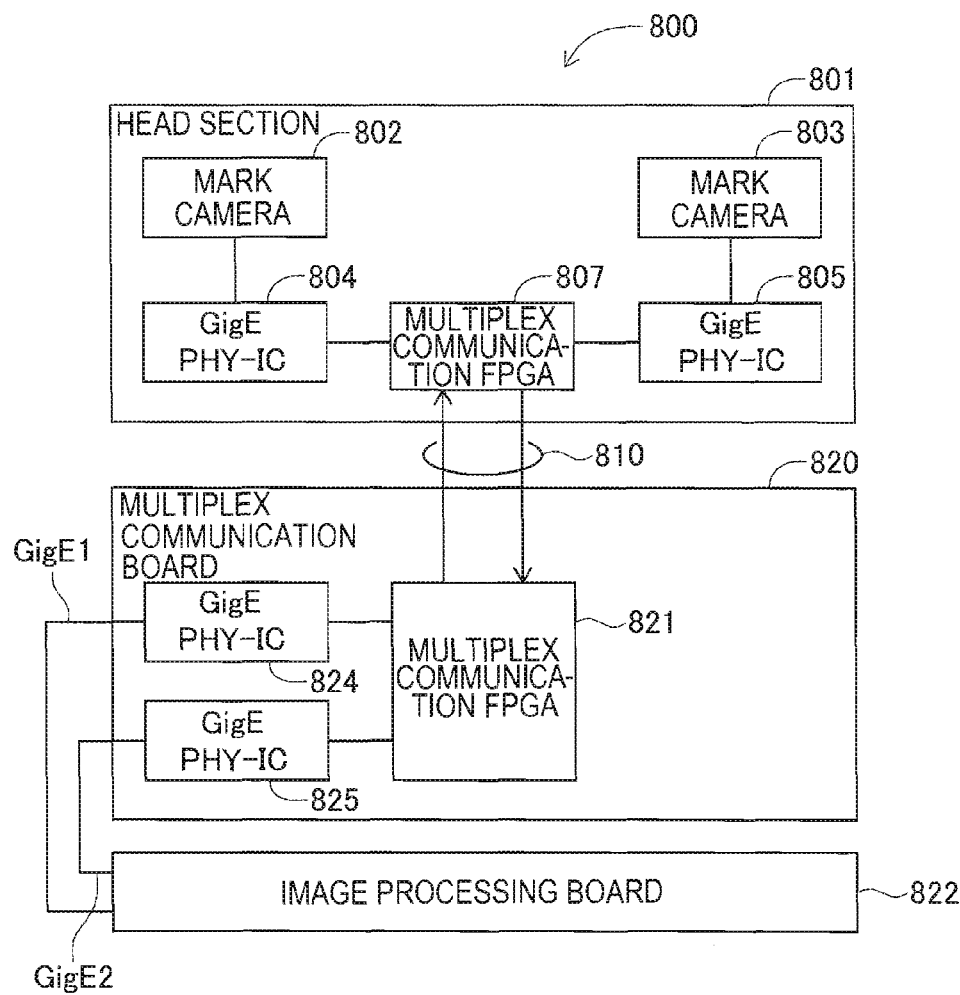
[FIG. 17]
<BEFORE CHANGE>

[FIG. 18]
<AFTER CHANGE>
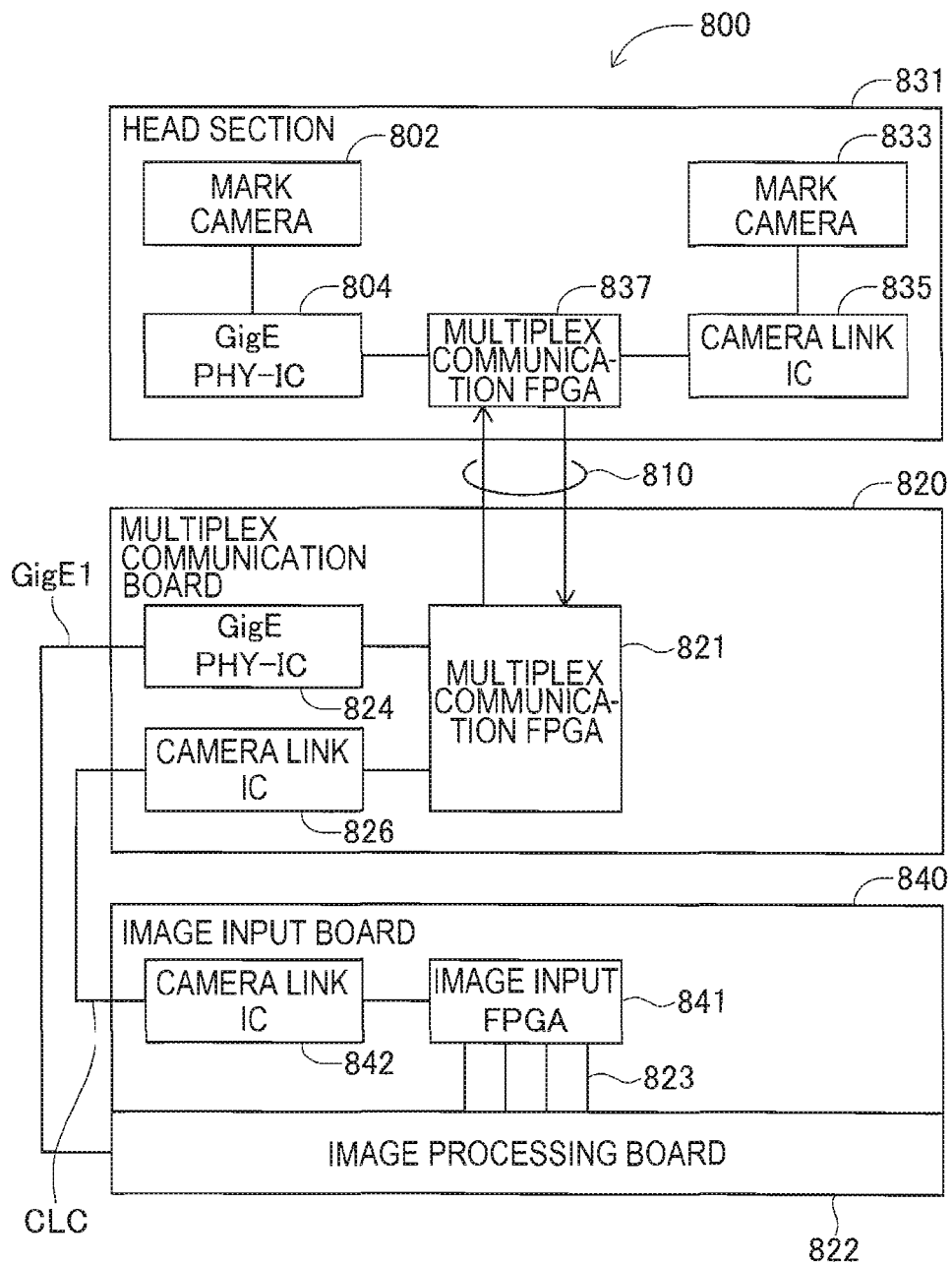

MULTIPLEXING COMMUNICATION SYSTEM AND SUBSTRATE WORKING MACHINE

TECHNICAL FIELD

The present disclosure relates to a multiplexing communication system and a substrate working machine, in which data concerning a mounting operation is transferred by the multiplexing communication system.

BACKGROUND ART

Technology relating to data transfer is disclosed in the related art. For example, technology is disclosed in which series of data are divided into blocks, and the number of bits for error correction for each of the blocks is increased/decreased according to the degree of necessity for the error correction of each of the blocks (refer to PTL 1 and the like). Furthermore, technology is disclosed in which, for image content that is coded through a network, correction packets are selected for reception, in a reception section, in the order of increasing amount of data and in which, in a case where the number of lost packets that are impossible to restore is smaller than a given number of packets, the lost packets are restored based on the correction packet that is used at that time (refer to PTL 2 and the like).

CITATION LIST

Patent Literature

PTL 1: JP-A-10-178419
PTL 2: JP-2010-161550

BRIEF SUMMARY

Problems to be Solved

In the background technology that is disclosed in PTL 1, series of data that are input are divided into blocks, and an error correction rule for each of the blocks that results from the division is specified. In the technology, for example, for a series of input data in which two types of data that require a different error correction rule that are alternately transferred, the data is divided into blocks according to the two types of data, and thus the error correction rule necessary for each of the blocks is made suitable.

Also, background technology that is disclosed in PTL 2 is for decreasing packet loss when the received image content is reproduced; in the background technology, multiple correction packets for restoring the lost packet are included, and correction packets of which a loss rate fall within a threshold range are indexed and are recorded as a content reception processing method.

However, in a case where communication uses a multiplex data string in which multiple types of data that have different error detection processing are mixed, error detection processing suitable for the type of data cannot be performed with any of the background technologies that are disclosed in the PTLs given above.

That is, in the background technology that is disclosed in PTL 1, it is assumed that the block is a successive-data string in the series of data and that the error correction rule for the successive-data string that is extracted as the block can be decided. If a multiplex data string in which the multiple types of data are mixed is divided as blocks, the multiple types of data are mixed in the block, and thus the error detection processing cannot be uniquely determined.

Furthermore, in the background technology that is disclosed in PTL 2, processing in which the loss rate of the packet falls within a stipulated range is determined from multiple types of error correction processing, and after the determination, the determined error correction processing is applied. The error correction processing that is applied to the image content that is received while viewing is in progress is one type of determined processing, and there is no disclosure of changing processing according to the details of the content. Details are not provided related to the suitable performing of error detection processing on each of the types of data when receiving a multiplex data string in which multiple types of data are mixed.

An object of the present disclosure, which is contrived in view of the problems described above, is to provide a multiplexing communication system and a substrate working machine, in which, even in a case where communication uses a multiplex data string in which multiple types of data that are different in error processing are mixed, it is possible to perform the error processing suitable for every type of data.

Means for Solving the Problem

According to an aspect of the technology that is disclosed in the present application, which is contrived in view of the problems described above, there is provided a multiplexing communication system that multiplexes multiple data which belong to multiple types of data which have a different stipulated data transfer rate and required data processing time, and that performs communication through wired communication, the system including: a transmitting side that includes an error setting device for performing setting processing for error detection in accordance with the data transfer rate and the data processing time, on each of the multiple data, and a multiplexing device for multiplexing the multiple pieces of data on which the setting processing for the error detection is performed by the error setting device, into a multiplex data string; and a receiving side that includes a restoration device for restoring the multiple data from the multiplex data string, and an error checking device for performing error detection processing or error detection/correction processing in accordance with the setting processing by the error setting device, on each of the multiple data that are restored, in which at least one of the transmitting side and the receiving side includes a processing circuit that performs at least one type of processing operation among I/O control processing, sensor information fetching processing, communication protocol conversion processing, image input processing that fetches an output of an image element, and communication processing by a slave on a control network, and that also functions as at least one of the multiplying device and the restoration device.

Here, the data transfer rate is a data transfer speed that is stipulated by a communication protocol which is applied to the multiplexing communication system. The data transfer rate is an amount of data that is transferred per unit time, which is stipulated according to the communication protocol, such as a signal communication speed that is determined according to a communication band or a communication method that is stipulated by the communication protocol, or a rate of a portion of one-unit communication occupied by actual data to one-unit communication. Furthermore, the data processing time is decided according to an amount of data or update frequency per unit time, which is required from processing or control that is performed on an individual type of data. The data processing time is the processing time relating to processing of data or to control using data, and is the time that it takes next processing or control to need new data. Furthermore, the processing circuit is, for example, a programmable logic device such as a field programmable gate array (FPGA) or a central processing unit (CPU).

Furthermore, according to another aspect of the technology that is disclosed in the present application, which is contrived in view of the problems described above, there is provided a substrate working machine, which performs a mounting operation with a workpiece being held with a movable section, in which data concerning the mounting operation is transferred by a multiplexing communication system. The multiplexing communication system that multiplexes multiple pieces of data which belong to multiple types of pieces of data which have a different stipulated data transfer rate and required data processing time, and that performs communication through wired communication, includes: a transmitting side that includes an error setting device for performing setting processing for error detection in accordance with the data transfer rate and the data processing time, on each of the multiple data, and a multiplexing device for multiplexing the multiple data on which the setting processing for the error detection is performed by the error setting device, into a multiplex data string; and a receiving side that includes a restoration device for restoring the multiple data from the multiplex data string, and an error checking device for performing error detection processing or error detection/correction processing in accordance with the setting processing by the error setting device, on each of the multiple data that are restored, in which at least one of the transmitting side and the receiving side includes a processing circuit that performs at least one type of processing operation among I/O control processing operation, sensor information fetching processing, communication protocol conversion processing, image input processing that fetches an output of an image element, and communication processing by a slave on a control network, and that also functions as at least one of the multiplexing device and the restoration device.

Effects

According to the technology that is disclosed in the present application, a multiplexing communication system and a substrate working machine are provided by which, even in a case where communication uses a multiplex data string in which multiple types of data that have different error processing are mixed, it is possible to perform the error processing suitable for every type of data.

BRIEF DESCRIPTION OF DRAWINGS

FIG. 1 is a perspective diagram illustrating an electronic component mounting device to which a multiplexing communication system according to the present embodiment is applied.

FIG. 2 is a schematic top-view diagram illustrating the electronic component mounting device from FIG. 1 with the upper cover removed.

FIG. 3 is a schematic diagram for describing a multiplexing communication system.

FIG. 4 is a diagram illustrating types of data that are transferred in the multiplexing communication system.

FIG. 5 is a block diagram illustrating a setting means of an optical multiplexing device.

FIG. 6 is a block diagram illustrating a checking means of the optical multiplexing device.

FIG. 7 is a diagram illustrating a configuration of frame data as a multiplex data string that is transferred in the multiplexing communication system.

FIG. 8 is a diagram illustrating transmission data in the 30th to 39th bit of frame data.

FIG. 9 is a schematic diagram for describing a connection between a circuit board height sensor 153 and a controller 86.

FIG. 10 is a flowchart illustrating details of processing after activation of the controller and the optical multiplexing device.

FIG. 11 is a flowchart illustrating details of processing after activation of the controller and the optical multiplexing device.

FIG. 12 is a schematic diagram for describing a logic circuit that an optical multiplexing device 5 has.

FIG. 13 is a schematic diagram for describing communication between an amplification section and a linear scale.

FIG. 14 is a diagram illustrating configuration of data that is transferred between the amplification section and the linear scale.

FIG. 15 is a schematic diagram illustrating an electronic component mounting device according to another embodiment.

FIG. 16 is a schematic diagram illustrating a state where a head section of the electronic component mounting device in FIG. 15 is changed.

FIG. 17 is a schematic diagram illustrating an electronic component mounting device as a comparative example.

FIG. 18 is a schematic diagram illustrating a state where a head section of the electronic component mounting device in FIG. 17 is changed.

DESCRIPTION OF EMBODIMENTS

Embodiments of the present disclosure will be described below referring to the drawings. First, as one example of an apparatus to which a communication system of the present application is applied, an electronic component mounting device (which, in some cases, is hereinafter referred to as a "mounter") is described.

(Configuration of Mounter 10)

As illustrated in FIG. 1, mounter 10 includes device main body 11, a pair of display devices 13 that are integrally provided to device main body 11, and supply devices 15 and 16 that are provided in such a manner that supply devices 15 and 16 are attachable to and detachable from the device main body 11. Mounter 10 according to the present embodiment is an apparatus that, under the control of controller 86 that is illustrated in FIG. 3, performs an operation of mounting an electronic component (of which an illustration is omitted) onto circuit board 100 that is transported by transportation device 21 which is accommodated within device main body 11. Moreover, according to the present embodiment, as illustrated in FIGS. 1 and 2, for description, a direction (the horizontal direction in FIG. 2) in which circuit board 100 is transported by conveyance device 21 is referred to as the X-axis direction, and a direction perpendicular to the X-axis direction that lies in the same plane as the direction of transportation of circuit board 100 is referred to as the Y-axis direction.

Device main body 11 has display devices 13 on the end portions thereof, one on one end portion and the other on the other end portion, in the Y-axis direction on one end side of the X-axis direction. Each display device 13 is a touch panel type display device, on which information relating to the mounting operation of the electronic component is displayed. Furthermore, supply devices 15 and 16 are mounted in such a manner that device main body 11 is interposed between supply devices 15 and 16 from both sides of the Y-axis direction. Supply device 15 is a feeder type supply device, and has multiple tape feeders 15A, in each of which various electronic components are accommodated in a state of being taped and being wound around a reel. Supply device 16 is a tray-type supply device, and has multiple component trays 16A (refer to FIG. 2) on which multiple electronic components are loaded.

FIG. 2 is a schematic top-view diagram illustrating the mounter 10 when viewed from the above (the upper side of FIG. 1) in a state where upper cover 11A (refer to FIG. 1) of device main body 11 is removed. As illustrated in FIG. 2, device main body 11 includes conveyance device 21 described above, head section 22 that mounts an electronic component onto circuit board 100, and moving device 23 that moves head section 22, on base 20.

Conveyance device 21 is provided at approximately the center portion in the Y-axis direction of base 20, and has a pair of guide rails 31, circuit board holding device 32 that is held by guide rails 31, and electromagnetic motor 33 that moves circuit board holding device 32. Circuit board holding device 32 holds circuit board 100. Electromagnetic motor 33 is driving-connected to a conveyor belt in a state where an output shaft is stretched to the side of guide rail 31. Electromagnetic motor 33, for example, is a servo motor that is capable of controlling a rotational angle with high precision. In conveyance device 21, the conveyor belt performs rotational motion based on the driving by electromagnetic motor 33, and thus circuit board 100 moves in the X-axis direction along with circuit board holding device 32.

Head section 22 has suction nozzle 41 that picks up an electronic component on the lower surface thereof and faces the circuit board 100. Suction nozzle 41 is connected to a negative pressure air and positive pressure air passage through an electromagnetic valve of a positive and negative pressure supply device (not illustrated), and picks up and holds an electronic component with negative pressure and releases the held electronic component by being supplied with a small amount of positive pressure. Built into head section 22 are multiple electromagnetic motors 43 (refer to FIG. 3) as driving sources for lifting and lowering suction nozzle 41 and rotating suction nozzle 41 about the axis thereof. Head section 22 changes the vertical position of the electronic component being held and a posture of the electronic component being held. Furthermore, multiple suction nozzles 41, each of which picks up an electronic component, are provided, and built into head section 22 is electromagnetic motor 43 that individually rotates each nozzle and so forth. Furthermore, head section 22 includes slave 45 (refer to FIG. 3) that is connected to a control network which will be described below. Slave 45, which is connected to the elements and the like of various sensors, processes signals that are input/output to/from the elements. Furthermore, parts camera 47 that captures an image of an electronic component that is held by suction nozzle 41 from a supply position of each of supply devices 15 and 16 is provided on head section 22. Image data that results from the image capture by parts camera 47 is processed in controller 86 (refer to FIG. 3), and thus an error in the position at which suction nozzle 41 holds the electronic component, and the like are acquired. Moreover, suction nozzle 41 is attachable to and detachable from head section 22, and can be changed according to the size, shape, and the like of the electronic component.

Furthermore, head section 22 is moved by moving device 23 to any position above base 20. To elaborate, moving device 23 includes X-axis direction slide mechanism 50 for moving head section 22 in the X-axis direction, and Y-axis direction slide mechanism 52 for moving head section 22 in the Y-axis direction. X-axis direction slide mechanism 50 has X-axis slider 54 that is provided on base 20 in such a manner that X-axis slider 54 is movable in the X-axis direction, and linear motor 56 (refer to FIG. 3) as a driving source. X-axis slider 54 moves to any position in the X-axis direction based on the driving by linear motor 56. In linear motor 56, for example, permanent magnets in which N-poles and S-poles are alternately arranged are provided on an internal wall of guide rail 56A as the stationary section side that is arranged on base 20, and an excitation coil is provided on X-axis slider 54 as the movable section side. Electric power is supplied to the excitation coil, and thus a magnetic field is produced and this magnetic field interacts with a magnetic field that is produced from the permanent magnets of guide rail 56A as the stationary section side. Due to this interaction, X-axis slider 54 moves. Note that, the configuration of linear motor 56 described above is one example and may be suitably changed. Also, the configuration of linear motor 56 described above has merit in that the number of excitation coils, which are more complicated than permanent magnet, can be limited; and merit in that a great propulsive force is easy to obtain, or the like, in comparison to a configuration in which the permanent magnets are provided on the movable section side (X-axis slider 54) and the excitation coil is provided on guide rail 56A at the stationary section side.

Furthermore, Y-axis direction slide mechanism 52 has Y-axis slider 58 that is provided on a flank side of X-axis slider 54 in such a manner that Y-axis slider 58 is movable in the Y-axis direction, and linear motor 60 (refer to FIG. 3) as a driving source. Y-axis slider 58 moves to any position in the Y-axis direction based on the driving by linear motor 60. Furthermore, mark camera 49 (refer to FIG. 3) for capturing an image of circuit board 100 is fixed to Y-axis slider 58, in a state where mark camera 49 faces downward. Accordingly, Y-axis slider 58 is moved and thus it is possible for mark camera 49 to capture an image of any position on circuit board 100. Image data that results from the image capture by mark camera 49 is processed in controller 86 (refer to FIG. 3), and thus information relating to circuit board 100, an error in a holding position, and the like are acquired. Further, head section 22 is attached to Y-axis slider 58, and, as moving device 23 is driven, moves to any position on base 20. Furthermore, head section 22 is attached to Y-axis slider 58 via connector 48 and is capable of being attached/detached with a single touch so as to change to a different type of head section, for example, a dispenser head, or the like.

FIG. 3 is a schematic diagram illustrating a configuration of a multiplexing communication system that is applied to mounter 10. As illustrated in FIG. 3, in mounter 10, the multiplexing communication system performs data transfer between controller 86 and amplification section 89 that are built into base 20 which is fixedly provided at a place where the device is installed, and each device that is included in Y-axis direction slide mechanism 52 and head section 22, among movable sections (X-axis direction slide mechanism 50, Y-axis direction slide mechanism 52, and head section 22) that move relatively to base 20. In other words, in mounter 10, each device (for example, linear scale 152) that is included in X-axis direction slide mechanism 50 is connected to a device (for example, the amplification section 89) at base 20 side without involving the multiplexing communication system. Moreover, the configuration of the multiplexing communication system that is illustrated in FIG. 3 is one example and may be suitably changed.

In mounter 10, optical multiplexing device 1 that is provided on Y-axis direction slide mechanism 52 is connected to optical multiplexing device 3 that is provided within base 20, through communication line 120 that is connected in a wired manner (for example, using an optical fiber cable). As illustrated in FIG. 2, optical multiplexing device 1 is provided on the lower surface of Y-axis slider 58, and is connected to optical multiplexing device 3 that is built into base 20 through an optical fiber cable. As illustrated in FIG. 3, in the optical multiplexing device 3, optical module 342 is connected to optical module 242 of optical multiplexing device 1 through the optical fiber cable, and transmits and receives frame data FRMD (refer to FIG. 5) that results from multiplexing various pieces of data, for example, with time division multiplexing (TDM), through communication line 120. Communication line 120, for example, is for 5 Gbps full-duplex communication.

Controller 86 is configured mainly as a computer that includes a CPU, a RAM, and so forth, and includes image board 91, drive control board 92, I/O board 93, and control board 94. Image board 91 controls transmission and reception of pieces of data (image data and the like) of mark camera 49 of Y-axis slider 58 and parts camera 47 of head section 22. Mark camera 49 is configured in such a manner that the image data that results from the image capture is able to be output to optical multiplexing device 1 at a high speed through a GigE cable GigE, according to image transfer specifications such as GigE-vision (a registered trade mark) that makes it possible to transfer data at a rate of a maximum of 1 Gbps through a digital interface. Furthermore, an external input terminal into which a trigger signal TRIG indicating starting of the image capture is input from an external device is provided on mark camera 49. Mark camera 49 captures an image according to the trigger signal TRIG from controller 86 (I/O board 93), and outputs image data that results from the image capture, to optical multiplexing device 1 through the GigE cable GigE. Image board 91 of controller 86 receives the image data that is transferred from mark camera 49 to optical multiplexing device 3 through communication line 120 ("GigEY (the Y-axis slide side) in the drawing).

Furthermore, in mounter 10, optical multiplexing device 1 that is provided on Y-axis direction slide mechanism 52 is connected to optical multiplexing device 5 that is provided on head section 22, through communication line 121 that is a wired line (for example, the optical fiber cable). Parts camera 47 of head section 22 is configured in such a manner that the image data that results from capturing the image according to the trigger signal TRIG from controller 86 (I/O board 93) is able to be output to optical multiplexing device 1 at a high speed through the GigE cable according to the image transmission specifications such as GigE-vision (a registered trade mark). Image board 91 of controller 86 receives the image data that is transferred from parts camera 47 to optical multiplexing device 3 ("GigEH (the head section side)" in the drawing). Controller 86 processes image data of parts camera 47 and mark camera 49 that are received by image board 91.

Drive control board 92 controls amplification section 89, and thus controls electromagnetic motor 43 of head section 22, linear motor 56 of X-axis direction slide mechanism 50, and linear motor 60 of Y-axis direction slide mechanism 52. Amplification section 89 has amplifiers 131, 132, and 133 that correspond to head section 22, X-axis direction slide mechanism 50, and Y-axis direction slide mechanism 52, respectively. Amplifier 131 corresponds to head section 22, and transmits an encoder signal such as an acknowledgment of an activation state toward encoders 140 of multiple electromagnetic motors 43 that are provided on head section 22, through communication lines 120 and 121. Furthermore, amplifier 131 receives and transfers an encoder signal such as torque information or positional information (serial communication that complies with RS-422 or RS-485) from encoder 140 and to drive control board 92, through communication lines 120 and 121. Drive control board 92 feedback-controls amplifier 131 in such a manner that each electromagnetic motor 43 is driven based on the encoder signal that is input. Electromagnetic motor 43 is a servo motor that is driven with three-phase AC that has U-phase, V-phase, and W-phase coils, and each of the U-phase, V-phase, and W-phase coils is connected to amplifier 131 through power source line 141. Electromagnetic motor 43 is driven according to the three-phase AC that is supplied from amplifier 131 through power source line 141. For example, with feedback control such as PID control in accordance with the received encoder signal (an "encoder signal ENCD" in FIG. 3), drive control board 92 changes a duty rate of power source voltage that amplifier 131 supplies to electromagnetic motor 43, and thus lifts or lowers the position of suction nozzle 41 (refer to FIG. 2).

Furthermore, linear scale 151 that detects the position of Y-axis slider 58 that moves on the guide rail along the Y-axis direction is provided on Y-axis direction slide mechanism 52. Linear scale 151 transmits a linear scale signal ("linear scale signal Y_LSD" in FIG. 3) such as a position (a value of a Y coordinate) in the Y-axis direction, of Y-axis slider 58 to amplifier 132 through communication line 120. Amplifier 132 controls linear motor 60 based on the linear scale signal that is received from linear scale 151.

In the same manner, linear scale 152 that detects the position of X-axis slider 54 which moves on the guide rail along the X-axis direction is provided on X-axis direction slide mechanism 50. Linear scale 152 is connected to amplifier 133 that corresponds to linear scale 152, without involving communication lines 120 and 121, and outputs a linear scale signal ("linear scale signal X_LSD" in FIG. 3) such as a position (a value of a X coordinate) in the X-axis direction, of X-axis slider 54, to amplifier 133. Amplifier 133 controls linear motor 56 based on the linear scale signal that is received from linear scale 152.

I/O board 93 processes signals for control of parts camera 47 and mark camera 49, detection signals from various sensors and the like, and so forth. For example, controller 86 controls I/O board 93 and thus transmits the trigger signal TRIG toward parts camera 47. Alternatively, controller 86 inputs a response signal from parts camera 47, which indicates ending of the image capture, and, when detecting the ending of the image capture, performs next control. Furthermore, circuit board height sensor 153 that measures the height position of the upper surface of circuit board 100 transported by conveyance device 21 (refer to FIG. 2) is provided on Y-axis direction slide mechanism 52. Circuit board height sensor 153 measures the height position of the upper surface of circuit board 100 with a reference height position of mounter 10 serving as a reference. Circuit board height sensor 153, for example, is a displacement sensor that is a contact type such as a touch sensor, or that is a non-contact-type such as laser type. Circuit board height sensor 153 transmits a result (a "displacement sensor signal DISD" in FIG. 3) of the measurement to I/O board 93 through communication line 120. Controller 86 adjusts a position to which suction nozzle 41 holding an electronic component is lowered toward circuit board 100 according to a result of the measurement by circuit board height sensor 153, which is received by I/O board 93.

Control board 94 is a board that controls signals of slave 45 of head section 22, and of slaves 161 and 162 to which various elements of X-axis direction slide mechanism 50 and Y-axis direction slide mechanism 52 are connected, and the like, through a control network. Network hub 164, which inputs and output the signals of slaves 45, 161, and 162 which are connected to the control network, into and from control board 94, in a collective or similar manner, is provided to the base 20. Control board 94 is connected to slave 45 of head section 22 through communication lines 120 and 121 and network hub 164. Furthermore, control board 94 is connected to slave 162 of Y-axis direction slide mechanism 52 through communication line 120 and network hub 164. Furthermore, control board 94 is connected to slave 161 of X-axis direction slide mechanism 50 through a LAN cable that is connected to network hub 164.

The control network here refers to MECHATROLINK (a registered trademark)-111 or EtherCAT (a registered trademark), and is for establishing a field network in which control board 94 serves as a master and control data and the like are transmitted and received to and from elements that are connected to slaves 45, 161, and 162, and thus for realizing wiring integration (reduction) and the like. Thus, a reduction in cost of establishing the network is achieved. More specifically, for example, EtherCAT (a registered trademark) is a network that has a structure in which an EtherCAT frame that is transmitted from a master (control board 94) is transferred in a manner that circulates among slaves 45, 161, and 162, and that is transmitted and received at a high speed. For example, as illustrated in FIG. 3, slave 162 performs reading or writing processing on the EtherCAT frame that is received from control board 94 (the stationary section side), and transfers a result of the processing to the head section 22 side. Slave 162 copies data from a position for the reading of data by slave 162, which is set in advance to be in the EtherCAT frame, and performs processing such as driving of a relay according to details of a copy of the data. Furthermore, slave 162 transfers the EtherCAT frame to head section 22, in a state where information indicating the completion of the driving of the relay, detection information from the sensor, or the like is written to a position for the writing of the data by slave 162, which is set in advance to be in the EtherCAT frame. In this manner, while performing input and output processing on the EtherCAT frame, slaves 45, 161, and 162 exchange frames at a high speed, and transfer the resulting frame. Moreover, the elements that are connected to slaves 45, 161, and 162 are a relay, a switch, a display lamp, and various sensors, and the like.

The multiplexing communication system that is applied to mounter 10 described above multiplexes data of each device (mark camera 49, electromagnetic motor 43, and the like) that is provided on head section 22 and Y-axis direction slide mechanism 52, using optical multiplexing devices 1 and 5, and transfers the resulting data, as an optical signal, toward optical multiplexing device 3 through communication lines 120 and 121 that are wired lines. Optical multiplexing device 3 demultiplexes the received optical signal that results from the multiplexing, and transfers individual pieces of data to boards that correspond to the individual pieces of data, respectively (for example, if data is image data that is obtained by mark camera 49, the data is transferred to image board 91). Controller 86 processes the data that is output from optical multiplexing device 3 to each board, and performs next control on head section 22 and the like. Then, while transferring the data relating to a mounting operation between each device using the multiplexing communication system, mounter 10 performs the operation of mounting electronic components on circuit board 100 that is held in conveyance device 21, using head section 22 (refer to FIG. 2).

More specifically, controller 86 drive-controls conveyance device 21, transports circuit board 100 all the way to a mounting operation position, and holds circuit board 100 in place at the mounting operation position. Next, controller 86 causes moving device 23 to move head section 22 to over circuit board 100, and causes mark camera 49 to capture an image of circuit board 100. Controller 86 detects the type of circuit board 100 and an error in the position at which conveyance device 26 holds circuit board 100, from the image data that is obtained by mark camera 49. Controller 86 causes supply devices 15 and 16 to supply an electronic component according to the detected type of circuit board 100, and moves head section 22 to a supply position of the electronic component. Head section 22 picks up the electronic component using suction nozzle 41. Particularly, parts camera 47 captures an image of the electronic component that is held by suction nozzle 41. The controller 86 detects the error in the position at which the electronic component is held from the image data that results from the image capture by parts camera 47. Then, moving device 23 moves head section 22 to a mounting position on circuit board 100. Head section 22 causes suction nozzle 41 to rotate about its own axis, and so forth, based on the errors in the positions at which circuit board 100 and the electronic component are held, and then mounts the electronic component onto circuit board 100.

(Type of Data that is Transferred and Error Checking Processing)

Next, error checking processing on various pieces of data that are transferred in the multiplexing communication system is described. FIG. 4 is a diagram illustrating one example of classification of types of data that are transferred in the multiplexing communication system, and illustrates 4 types of data, that is, classes A to D. A signal that is classified into (A) is a high-speed signal, and is, for example, pieces of image data IMGD that are obtained by parts camera 47 and mark camera 49, which is to be processed by image board 91. A signal that is classified into (B) is a mid-speed signal, and is, for example, control data CTLD that is input into and output to slaves 45 and 162 on the control network, which is to be processed by control board 94. A signal that is classified into each of (C) and (D) is a low-speed signal, and is, for example, an encoder signal ENCD of encoder 140, which is to be processed by amplifier 131, a linear scale signal LSD of linear scale 151, which is to be processed by amplifier 132, the displacement sensor signal DISD of circuit board height sensor 153, which is to be processed by I/O board 93, or a parallel I/O signal PIOD such as the trigger signal TRIG for parts camera 47 and mark camera 49, which is to be processed by I/O board 93. Note that, the classifications and the types of data that are illustrated in FIG. 4 are one example.

The image data IMGD that is classified into (A) is, for example, at 2000×2000 pixels per frame, and is data that has gradation with a width range of 8 bits per pixel. Because the image data IMGD is large in terms of an amount of data, it is not realistic to perform data retransmission in the event of an error such as a burst error. Because of this, instead of the retransmission, it is common that error correction is performed at a reception destination. Error processing of the image data IMGD, for example, uses a Reed-Solomon code in which multiple successive bits of the image data IMGD are handled as one symbol and error correction is made possible on a symbol basis. Because in the error processing of the image data IMGD, an amount of data increases according to a coding rate, a data transfer rate of 1 Gbps or more is required as a standard specification for the field network in an FA field. On the other hand, for data transfer of the image data IMGD, approximately 100 µs to 1 ms is necessary as a delay time ("permitted delay time" in the drawing) when considering processing time to update screen display in one frame. During the permitted delay time, processing for the error correction of the image data IMGD is performed and then the screen display is updated. Due to features of the type of data described above, the permitted delay time for the image data IMGD is long and the image data IMGD is large in terms of the amount of data, in comparison to other types of data (the control data CTLD and the encoder signal ENCD). Because of this, a high-speed data transfer rate is set, and there is a need for a high-speed data request rate that results from considering the time for the update processing as well. Moreover, a configuration may be employed in which, usually, mounter 10 performs processing (for example, binarization) on the image data IMGD, and thus transfers the data that is reduced in terms of the amount of data, and in which only when an operator checks an image for an error, the image data IMGD that is possible to display as an image in one frame is transferred.

The control data CTLD that is classified into (B) is data for control board 94 to promptly drive a relay or a switch that is connected to slave 45. On the other hand, the control data CTLD is small in terms of a necessary amount of data in comparison to the image data IMGD. Because of this, for the control data CTLD, for example, a data transfer rate of 100 Mbps or more is required as the standard specification for the field network in the FA field. On the other hand, for example, for high speed, the permitted delay time is required to the extent of approximately several µs to 1 ms due to a limitation of specifications and the like for communication protocols for the control network. Due to the features of the type of data described above, a middle-speed data request rate is set for the control data CTLD. Furthermore, for the purpose of control, there is also error checking processing that requires reliability, such as when an element is driven and so forth. In the error checking processing, forward error correction code FEC (15, 11) that is a Hamming code which is comparatively easy to decode is assigned. Accordingly, while securing the reliability, high-speed error checking processing can be performed. Moreover, for correction code FEC (15, 11), a shortened code may be used according to a bit width within which the control data CTLD within a multiplex data string (refer to the frame data FRMD in FIG. 7) that is transferred over communication line 120 is bit-allocated.

A data transfer rate for the encoder signal ENCD (a linear scale signal LSD in a case of the linear scale 151) that is classified into (C) is approximately 10 Mbps. However, the encoder signal ENCD is short (to the extent of several µS) in terms of the permitted delay time in comparison to the control data CTLD, thus more prompt processing is required. Furthermore, the displacement sensor signal DISD is several 10 µS in terms of the permitted delay time.

However, because the displacement sensor signal DISD is a serial signal, it is desirable that it is possible to promptly detect an error each time one-time data transfer is performed. Because of this, for example, forward error correction code FEC (7, 4) that is a Hamming code is assigned to the encoder signal ENCD and the displacement sensor signal DISD.

A high speed is not required of the parallel I/O signal PIOD that is classified into (D). For example, if a data transfer rate of several kbps and the permitted delay time of approximately several µS are secured, this is sufficient. Because of this, in the error checking processing, for example, the same parallel I/O signal PIOD to which a parity code is assigned is transferred multiple times, and in a case where pieces of data that are successively transferred are consistent with one another, processing that acquires data is performed. Furthermore, in the checking processing, in a case where the pieces of data that are successively transferred are not consistent with one another, the transfer of the data is canceled.

Next, error detection in accordance with the type of data described above, and correction processing will be described below.

A case where optical multiplexing device 1 is defined as a transmitting side and optical multiplexing device 3 is defined as a receiving side is described below. Moreover, because optical multiplexing device 5 has the same configuration as optical multiplexing devices 1 and 3, a description thereof is suitably omitted. FIG. 5 is a block diagram that illustrates a transmitting portion of optical multiplexing device 1. Furthermore, FIG. 6 is a block diagram that illustrates a receiving portion of the optical multiplexing device 3. A transmission data composition processing section 201 of optical multiplexing device 1 that is illustrated in FIG. 5 performs error setting processing in accordance with the type of data on data (the image data IMGD, the control data CTLD, the encoder signal ENCD, the displacement sensor signal DISD, or the parallel I/O signal PIOD) that is output from each device.

(Configuration of Transmission Data Composition Processing Section 201)

The image data IMGD is fetched by data fetching section 203 of transmission data composition processing section 201. Data fetching section 203, for example, temporarily fetches pieces of image data IMGD from mark camera 49 one line by one line, and accumulates the fetched pieces of image data IMGD temporarily. FEC assignment section 211 calculates the forward error correction code (FEC) that is a Reed-Solomon code, according to the image data IMGD that is input from data fetching section 203. FEC assignment section 211, for example, processes the image data IMGD that is input, as a symbol with a bit width of 8 bits, generates a redundant symbol, and thus assigns the generated redundant symbol as the forward error correction code. FEC assignment section 211, for example, outputs the image data IMGD to which the redundant symbol is assigned, to multiplexing section (MUX) 219 on an 8-bit symbol basis.

The control data CTLD is temporarily fetched by data fetching section 204, and forward error correction code FEC (15, 11) that is a Hamming code is assigned to the control data CTLD by FEC assignment section 212. Frame division section 221 divides the control data CTLD to which the FEC is assigned, by a bit width for bit allocation, to which the frame data FRMD (refer to FIG. 7) corresponds to. Frame division section 221 transfers the control data CTLD that results from the division to multiplexing section 219. Counting section 234 counts the number of times that multiplexing section 219 transmits the frame data FRMD. Frame division section 221 performs processing that reads the control data CTLD from FEC assignment section 212 according to a counting value that is output from counting section 234.

The encoder signal ENCD, the linear scale signal LSD, and the displacement sensor signal DISD are temporarily fetched in data fetching sections 205 to 207, respectively, and the forward error correction code FEC (7, 4) that is a Hamming code, is assigned to the encoder signal ENCD, the linear scale signal LSD, and the displacement sensor signal DISD, by FEC assignment section 213. For example, when reading the linear scale signal LSD from linear scale 151 through communication that complies with communication specifications in a high level data link control (HDLC) procedure, data fetching section 205 performs processing that fetches data DATA2 necessary to detect a starting flag S1 and an ending flag E1 (refer to FIG. 14). Frame division section 222 divides the encoder signal ENCD, the linear scale signal LSD, and the displacement sensor signal DISD, to all of which the FEC is assigned, according to the frame data FRMD. Frame division section 222 outputs the encoder signal ENCD, the linear scale signal LSD, and the displacement sensor signal DISD, which result from the division, to multiplexing section 219. Frame division section 222 performs processing that reads next data from FEC assignment section 213 according to the counting value that is output from counting section 234. Moreover, FEC assignment section 213 adds information (refer to FIG. 8) indicating the presence or absence of data according to input of the encoder signal ENCD and the linear scale signal LSD, and then assigns forward error correction code FEC (7, 4) that is a Hamming code.

The parallel I/O signal PIOD is fetched in input section 231. Input section 231, for example, extracts a command indicating completion of the image capture, as the parallel I/O signal PIOD, from a signal that is input from mark camera 49, and outputs a result of the extraction to data holding section 235. Frame division section 232 inputs the parallel I/O signal PIOD from data holding section 235, and divides the parallel I/O signal PIOD that is input, according to the frame data FRMD. Frame division section 232 performs processing that, according to a counting value that is output from counting section 234, updates data which is output to multiplexing section 219 and reads data from data holding section 235. For example, frame division section 232 outputs the same parallel I/O signal PIOD to multiplexing section 219 until the count value reaches the stipulated number of times that is determined in advance. When the counting value reaches the stipulated number of times, frame division section 232 outputs the parallel I/O signal PIOD that results from reading data from data holding section 235 and updates the data that is read to multiplexing section 219.

(Configuration of Reception Data Demultiplexing Processing Section 301)

The multiplexing section 219 multiplexes various pieces of data that are input, for example, according to a fixed period of time (a time slot) that is allocated to an input port. Data that results from the multiplexing by multiplexing section 219 is converted by optical module 242 into an optical signal, and is output, as the frame data FRMD that is illustrated in FIG. 7, to communication line 120. Optical multiplexing device 3 that is illustrated in FIG. 6 converts the optical signal that is received through communication line 120 into an electrical signal using optical module 342. Optical modules 242 and 342, for example, are optical transceivers that comply with SFP+ specifications. The electric signal that results from the conversion by optical module 342 is demultiplexed by demultiplexing section (DEMUX) 319 of reception data demultiplexing processing section 301 into the pieces of data. Reception data demultiplexing processing section 301 performs error detection processing or error detection/correction processing on the pieces of data that result from the demultiplexing, according to an error setting that is given to every type of data.

In decoding correction processing section 311, error detection is performed on the image data IMGD according to the forward error correction code (FEC) that is a Reed-Solomon code, and processing that corrects an erroneous data value is performed on the image data IMGD whenever necessary. Data output sections 303 to 308 that control output of various pieces of data are connected to output portions, respectively, of reception data demultiplexing processing section 301, which correspond to boards 91 to 94, respectively. Pieces of image data IMGD on which correction and the like are performed are temporarily accumulated in data output section 303, and are output to image board 91.

With regard to the control data CTLD, pieces of control data CTLD that result from the division into multiple pieces of frame data FRMD are composited by a frame composition section 321. Counting section 332 counts the number of times that demultiplexing section 319 receives the frame data FRMD. Frame composition section 321 composites the pieces of control data CTLD according to a counting value that is output from counting section 332, and outputs a result of the composition to decoding correction processing section 312. Decoding correction processing section 312 performs the error detection on the control data CTLD that results from the composition, according to the forward error correction code (FEC) that is a Hamming code, and performs the processing that corrects the erroneous data value, on the control data CTLD that results from the composition, whenever necessary. The pieces of control data CTLD that are corrected are temporarily accumulated in data output section 304 and are transferred to control board 94.

With regard to the encoder signal ENCD, the linear scale signal LSD, and the displacement sensor signal DISD, the encoder signals ENCD and the like that result from the division into pieces of multiple frame data FRMD are composited by frame composition section 322. Frame composition section 322 composites the encoder signals ENCD or the like according to a counting value that is output from counting section 332, and outputs a result of the composition to decoding correction processing section 312. Decoding correction processing section 313 performs the error detection on the encoder signal ENCD that results from the composition, and the like, according to the forward error correction code (FEC) that is a Hamming code, and performs the processing that corrects the erroneous data value, on the encoder signal ENCD that results from the composition, and the like, whenever necessary. The encoder signals ENCD and the linear scale signals LSD that are corrected are temporarily accumulated in data output section 305, and are transferred to drive control board 92 (amplification section 89). Furthermore, the displacement sensor signals DISD that are corrected are temporarily accumulated in data output section 307, and are transferred to I/O board 93.

Frame composition section 331 composites the parallel I/O signals PIOD according to a counting value that is output from counting section 332, and outputs a result of the composition to multiple-times consistence detection section 334. Multiple-times consistence detection section 334 determines whether or not the same parallel I/O signals PIOD that are transmitted, as many times as stipulated, from frame division section 232 of transmission data composition processing section 201 are data-consistent. For example, while the number of times that the same parallel I/O signal PIOD is transferred does not reach the stipulated number of times, multiple-times consistence detection section 334 detects whether or not the parallel I/O signals PIOD are data-consistent. In a case where the number of times that the parallel I/O signal PIOD is transferred reaches the stipulated number of times, multiple-times consistence detection section 334 determines the number of times that the parallel I/O signals PIOD are data-consistent or the number of times that the parallel I/O signals PIOD are not data-consistent, in transferring the data a stipulated number of times. For example, in a case where pieces of data are consistent in all detection processing operations, multiple-times consistence detection section 334 outputs the parallel I/O signal PIOD to I/O board 93. If a result that the pieces of data are not consistent is detected even one time, multiple-times consistence detection section 334 discards the parallel I/O signal PIOD that is transferred, and makes a request to controller 86 for re-transmission processing. Note that, because a configuration and operation of reception data demultiplexing processing section 202 that is included in optical multiplexing device 1 which is illustrated in FIG. 5 are the same as those of reception data demultiplexing processing section 301 described above, descriptions thereof are omitted. In the same manner, because a configuration and operation of transmission data composition processing section 302 that is included in optical multiplexing device 3 which is illustrated in FIG. 6 are the same as those of transmission data composition processing section 201 that is illustrated in FIG. 5, descriptions thereof are omitted.

(Configuration of the Frame Data FRMD)

FIG. 7 illustrates a configuration of the frame data FRMD that is transmitted from optical multiplexing device 1 to optical multiplexing device 3, which is one example of the bit allocation corresponding to the frame data FRMD as a multiplex data string. For the frame data FRMD, for example, one frame is configured from 40 bits. For optical multiplexing devices 1 and 3, a periodicity per frame is set to 8 nsec (a frequency of 125 MHz), and communication line 120 with a rate of 5 Gbps (40 bits×125 MHz) is established.

For the frame data FRMD, a header HEADER (a synchronization bit or the like) for multiplex communication is set to occupy the 0th to 9th bits. Furthermore, for the frame data FRMD, the image data IMGD is set to occupy the 10th to 29th bits. For example, the image data IMGD that is obtained by parts camera 47 is transferred using 8 bits among 10 bits from the 10th to 19th bits. The remaining 2 bits are bit values that are reserved for coding processing (for example, 8B/10B conversion) for maintaining DC balance of the image data IMGD. For example, multiplexing section 219 performs 8B/10B conversion on the image data IMGD on an 8-bit symbol basis, which is output from FEC assignment section 211, and performs multiplexing. Multiplexing section 219 multiplexes data that results from the 8B/10B conversion along with different data, and transfers the resulting data to optical module 242, with the header HEADER being added to the resulting data. In the same manner, mark camera 49 performs the transfer using 8 bits among 10 bits from the 20th to 29th bits. The remaining 2 bits are DC balance bits that are reserved for the 8B/10B conversion. Moreover, in a case where only one of parts camera 47 and mark camera 49 transmits data, for the 10th to 29th bits of the frame data FRMD, the image data IMGD that is obtained by parts camera 47 may be set to be in all bits from the 10th to 29th bits, for example, in an operation process that uses parts camera 47.

Furthermore, for the frame data FRMD, various pieces of data (the parallel I/O signal PIOD, the control data CTLD, the encoder signal ENCD, the linear scale signal LSD, and the displacement sensor signal DISD) are set to be in 8 bits among 10 bits from the 30th to 39th bits. The remaining 2 bits are DC balance bits that are reserved from the 8B/10B conversion by multiplexing section 219. The 32nd bit is the parallel I/O signal PIOD that is output from parts camera 47 which is provided on head section 22. Furthermore, the 33rd bit is the parallel I/O signal PIOD that is output from mark camera 49 which is provided on Y-axis direction slide mechanism 52. In an example that is illustrated in FIG. 7, for the parallel I/O signal PIOD, a bit width of one bit is secured with respect to each of head section 22 and Y-axis direction slide mechanism 52. Because of this, for example, in a case where each of the parallel I/O signals PIOD is output to multiplexing section 219, frame division section 232 that is illustrated in FIG. 5 divides the parallel I/O signal PIOD one bit by one bit for every frame data FRMD.

FIG. 8 illustrates data that is set to be in the 30th to 39th bits at every one clock (at a frequency of 125 MHz and a periodicity of 8 nsec per clock) at which the frame data FRMD is transmitted. For the frame data FRMD, data is set to be at each bit position during every cycle, with 10 clocks as one cycle (one periodicity). Therefore, in an example that is illustrated in FIG. 8, the same data as the frame data FRMD at the 0th clock in FIG. 8 is set to be at the 1st clock during the next cycle, that is, to the 10th clock, for transmission. After transmitting the pieces of frame data FRMD at 9 successive clocks, optical multiplexing devices 1 and 3 transmit pieces of dummy data at the next clock and are mutually synchronized. Moreover, a portion that is indicated by an oblique line in FIG. 8 is dummy data, and is set to a bit value indicating "O".

As described above, for the 32nd bit, the parallel I/O signal PIOD ("PIOH0 to PIOH3" in the drawing) that is output from parts camera 47 of head section 22 is set to be at every clock. Furthermore, for the 33rd bit, the parallel I/O signal PIOD ("PIOY0 to PIOY3" in the drawing) that is output from mark camera 49 of Y-axis direction slide mechanism 52 is set to be at every clock. Furthermore, the control data CTLD is set to be in the 34th to 35th bits. For the 34th bit, the control data CTLD is set to be at 4 clocks during one cycle. For the 34th bit, information ("presence of CTL" in the drawing) indicating the presence or absence of data which is added by FEC assignment section 213 at the clock next to the clocks that the control data CTLD is set to be at is set. Furthermore, for the 34th bit, a shortened code for correction code FEC (15, 11) is set to be at 4 clocks during one cycle (clocks 5 to 8 in the example that is illustrated). Furthermore, the control data CTLD is set to be in the 35th bit, as is the case with the 34th bit.

Furthermore, the encoder signal ENCD is set to be in the 36th to 38th bits that are illustrated in FIG. 7. As illustrated in FIG. 8, for the 36th to 38th bits, the encoder signal ENCD and information ("presence of ED1 to presence of ED6") indicating the presence or absence of data of the encoder signal ENCD are set to be at 4 clocks (clocks 0, 1, 3, and 4 in the example that is illustrated), during one cycle (10 clocks). The information indicating the presence or absence of the data, for example, is information for indicating whether or not the encoder signal ENCD that is slow with respect to a data transfer rate of the frame data FRMD is set to be in the 36th to 38th bits. The encoder signal ENCD and the information indicating the presence or absence of the data are set alternately during each cycle. Furthermore, for the 36th to 38th bits, 3-bit code bits that are added as the correction code FEC (7, 4), are set to be at 3 clocks (clocks 6 to 8 in the example that is illustrated) during one cycle. Furthermore, the displacement sensor signal DISD and the linear scale signal LSD are set to be in the 39th bit. For the 39th bit, the displacement sensor signal DISD (the linear scale signal LSD) and the information indicating the presence or absence of the data are set to be at 4 clocks alternately during one cycle. Furthermore, for the 39th bit, code bits that are added as the correction code FEC (7, 4) are set to be at 3 clocks during one cycle. The encoder signal ENCD and the like are divided by frame division sections 221, 222, and 232 according to the bit width for the bit allocation, to which the frame data FRMD corresponds, and are transferred to multiplexing section 219. Moreover, a configuration of the frame data FRMD that is illustrated in FIG. 7 is one example, and can be suitably changed. Furthermore, a bit for which the same type of data is set may be allocated for every device and be used. Specifically, in a case where head section 22 includes multiple encoders 140 and is controlled in a multi-axial manner, a configuration may be employed in which for the 36th to 38th bits, ED1 to ED6 for the bit allocation are properly used for every encoder 140.

(Connection Between Circuit Board Height Sensor 153 and Controller 86)

Next, a connection between circuit board height sensor 153 and optical multiplexing device 1 is described. FIG. 9 is a schematic diagram for describing the connection between circuit board height sensor 153 and controller 86, and illustrates one portion of mounter 10. As illustrated in FIG. 9, optical multiplexing device 1 includes a logic device that is programmable, for example, logic circuit 410 that is configured as a field programmable gate array (FPGA). Logic circuit 410 includes transmission data composition processing section 201 and reception data demultiplexing processing section 301 (refer to FIG. 6), which are described above, as a circuit block that is an FPGA.

Furthermore, optical multiplexing device 1 has operational amplifier 411 and A/D conversion circuit 413 built into a housing thereof. Operational amplifier 411 amplifies a detection signal that is obtained by sensor element 153A of circuit board height sensor 153. Sensor element 153A is, for example, a light receiving element such as a photo detector (PD) that receives reflected light which results from reflecting a laser beam which is emitted by a light emitting section, and that outputs an analog signal in accordance with an amount of received light as the displacement sensor signal DISD. Operational amplifier 411 amplifies the displacement sensor signal DISD that is output by sensor element 153A, and outputs the resulting displacement sensor signal DISD to A/D conversion circuit 413. A/D conversion circuit 413 converts the displacement sensor signal DISD that is input from operational amplifier 411 into a digital signal that is processed by logic circuit 410. Transmission data composition processing section 201 of logic circuit 410 multiplexes the displacement sensor signal DISD (the digital signal) that is input from A/D conversion circuit 413, along with different data (image data IMGD or the like), and transmits a result of the multiplexing to optical multiplexing device 3 through communication line 120. Reception data demultiplexing processing section 301 of optical multiplexing device 3 demultiplexes the displacement sensor signal DISD from the frame data FRMD which is transmitted from the optical multiplexing device 1, and outputs a result of the demultiplexing from switching means 401 that will be described below, to controller 86.

Optical multiplexing device 1 with the configuration described above has operational amplifier 411 and A/D conversion circuit 413 built into it, and thus a one-board configuration can be employed in which logic circuit 410 that performs multiplexing processing, operational amplifier 411, and A/D conversion circuit 413 are mounted on a board. With this configuration, for example, wiring (for example, a serial cable that complies with RS-422) that connects A/D conversion circuit 413 and logic circuit 410 is unnecessary in comparison to a configuration that results in a case where circuit board height sensor 153 has operational amplifier 411 and the A/D conversion circuit 413 built into it, along with sensor element 153A. Accordingly, because the number of communication lines, the number of boards, and the like can be reduced, optical multiplexing device 1 can be configured in such a manner that a reduction in the cost of manufacturing mounter 10 is achieved.

(Communication Establishment and Communication Error Processing in Multiplexing Communication System)

Next, communication establishment at the time of activating the multiplexing communication system and error processing while communication is in progress in the multiplexing communication system is described. As illustrated in FIG. 9, optical multiplexing device 3 includes, for example, logic circuit 400 that is configured as an FPGA. Logic circuit 400 includes switching means 401 as a circuit block that is an FPGA, in addition to transmission data composition processing section 201 (refer to FIG. 5), reception data demultiplexing processing section 301, and the like. Optical multiplexing device 3 transmits a signal illustrating communication establishment and a communication error to controller 86, through a different communication line that is shared. As illustrated in FIG. 9, optical multiplexing device 3 is described in more detail as connecting to controller 86 through cable 415 (for example, one that complies with RS-422) with which the serial communication is available. Cable 415 is a communication line over which the displacement sensor signal DISD that is demultiplexed by optical multiplexing device 3 from the frame data FRMD which is transferred from optical multiplexing device 1 is output to controller 86 (I/O board 93).

External terminal 3A of optical multiplexing device 3 is connected to external terminal 86A of controller 86 through cable 415. Furthermore, switching means 401 of optical multiplexing device 3 performs processing that switches a signal which is output from external terminal 3A to a displacement sensor signal DISD, a multiplex internal state signal SI1 indicating communication establishment in optical multiplexing device 3 and to a multiplex abnormal signal SI2 indicating a communication error. When it is detected at the time of activating the multiplexing communication system that communication line 120 to optical multiplexing device 1 is established, optical multiplexing device 3 outputs the multiplex internal state signal SI1 from external terminal 3A to controller 86. Controller 86 includes an input section 421 into which an input signal of external terminal 86A is input, and processing section 422 that processes the signals SI1 and SI2. Input section 421 and processing section 422 are, for example, processing modules (programs) that are executed by a CPU of controller 86. Then, input section 421, for example, determines a header portion of a signal that is input from external terminal 86A (cable 415). If the displacement sensor signal DISD is present, input section 421 outputs the displacement sensor signal DISD to I/O board 93. If the signals SI1 and SI2 are present, input section 421 outputs the signals SI1 and SI2 to processing section 422. Processing section 422 performs activating, stopping, or the like of amplification section 89 (refer to FIG. 3) according to the signals SI1 and SI2 that are input.

Next, processing that establishes the communication in the multiplexing communication system and the error processing while the communication is in progress in the multiplexing communication system will be described referring to flowcharts that are illustrated in FIGS. 10 and 11.

First, as mounter 10 is activated, controller 86 starts processing (processing in the flow on the left side of FIG. 10). Controller 86, for example, receives a command for a production job from a general control device (an illustration of which is omitted) that is connected to a network for a production line (Step S11). Moreover, mounter 10 may be configured as a device in which controller 86 reads the production job from a memory within mounter 10 and processes the production job, and which operates independently. Prior to the starting of the production job, controller 86 starts processing that receives the multiplex internal state signal SI1 indicating establishment of communication line 120 from optical multiplexing device 3 (Step S12). Controller 86 is in a waiting state until the multiplex internal state signal SI1 is input from optical multiplexing device 3 (NO in Step S13).

On the other hand, as mounter 10 is activated, optical multiplexing device 3 starts processing (processing in the flow on the right side of FIG. 10). Optical multiplexing device 3 starts processing that reads configuration data from the memory and the like and establishes a circuit block within logic circuit 400 which includes switching means 401 and the like (Step S21). When configuration is completed, optical multiplexing device 3 transmits a checking signal indicating that the processing that establishes communication line 120 starts, toward reception data demultiplexing processing section 301 (refer to FIG. 6) of optical multiplexing device 1 that transmission data composition processing section 201 (refer to FIG. 5) faces (Step S22). Optical multiplexing device 3 periodically transmits the checking signal until a response signal is received from optical multiplexing device 1, and establishes communication line 120 (NO in Step S23). When the establishment of communication line 120 between optical multiplexing device 3 and optical multiplexing device 1 is completed (YES in Step S23), optical multiplexing device 3 transmits the multiplex internal state signal SI1 notifying that the communication is established, toward controller 86 (Step S24). Under this circumstance, optical multiplexing device 3 outputs the multiplex internal state signal SI1 to which switching means 401 switches a signal that is output from external terminal 3A, from cable 415 to controller 86. Furthermore, input section 421 of controller 86 detects the multiplex internal state signal SI1, and outputs the detected multiplex internal state signal SI1 to processing section 422. When it is detected that communication line 120 over which the multiplex internal state signal SI1 is received is established (YES in Step S13), processing section 422 activates amplification section 89 (Step S14 in FIG. 11). Controller 86 stops control of amplification section 89 until a signal indicating completion of the activation is received from amplification section 89 (NO in Step S15). When it is detected that the activation of amplification section 89 is completed (Yes in Step S15), controller 86 starts an operation of mounting an electronic component onto circuit board 100 while transferring data concerning the mounting operation in the multiplexing communication system through the established communication line 120 (Step S16). Moreover, as is the case with the establishment of communication line 120, controller 86 performs processing that confirms the establishment of communication line 121 between optical multiplexing devices 1 and 5.

On the other hand, when communication line 120 is established, optical multiplexing device 3 starts data transfer to optical multiplexing device 1 (Step S25 in FIG. 11). Optical multiplexing device 3 monitors the communication error while an operation is in progress. For example, reception data demultiplexing processing section 301 of optical multiplexing device 3 periodically determines a received signal strength indicator (RSSI) that is based on an electric current signal which is input from optical module 342 (refer to FIG. 6) into demultiplexing section 319 (NO in Step S26). In a case where the received signal strength indicator of optical module 342 shows a low level (YES in Step S26), demultiplexing section 319 transmits the multiplex abnormal signal SI2 to controller 86 that detects a malfunction such as disconnection of communication line 120 (Step S27). Moreover, demultiplexing section 319 may be configured in such a manner that determination is made using a different method, for example, by periodically transmitting a checking signal to optical multiplexing device 1 and checking a signal that is in response to the communication signal, without determining the communication error using the received signal strength indicator.

Furthermore, optical multiplexing devices 1 and 3 monitor connection to a device that outputs a multiplexing-target signal, in addition to communication errors in communication line 120. For example, optical multiplexing device 3 periodically monitors whether connection to controller 86 or amplification section 89 malfunctions. Furthermore, for example, optical multiplexing device 1 periodically monitors whether connection to linear scale 151, slave 162, or the like malfunctions. In a case where an input from a different device is not present only for a given time or in a case where a response to the checking signal is not present, optical multiplexing devices 1 and 3 detect that the connection malfunctions. When it is detected that the connection malfunctions, optical multiplexing devices 1 and 3 transmit the multiplex abnormal signal SI2 to controller 86 (Step S27).

When mounter 10 starts the mounting operation, processing section 422 monitors whether the multiplex abnormal signal SI2 is input from optical multiplexing device 3 (Step S17). If the multiplex abnormal signal SI2 is not input into processing section 422 (NO in Step S18), controller 86 continues to perform the mounting operation (Steps S16 and S17). Furthermore, when the multiplex abnormal signal SI2 is input from optical multiplexing device 3 (YES in Step S18), controller 86 and processing section 422 perform the error processing such as stopping of each device such as amplification section 89 and displaying of an alarm on display device 13 (refer to FIG. 1) (Step S19).

With the configuration described above, because cable 415 can not only output the displacement sensor signal DISD, but can also be shared as a communication line over which the multiplex internal state signal SI1 and the multiplex abnormal signal SI2 are output, the number of wiring lines connecting between controller 86 and optical multiplexing device 3 can be reduced. Furthermore, switching means 401 is a circuit block that is configured to be on logic circuit 400. Therefore, in optical multiplexing device 3, there is no need to add a processing circuit such as a hardware element in order to share cable 415. As a result, with this configuration, because the number of communication lines can be reduced without adding the processing circuit and so forth, the reduction in the cost of manufacturing optical multiplexing device 3 and also mounter 10 is achieved.

(Activation Timing of Amplification Section 89)

Next, activation timing of amplification section 89 is described. As described above, as mounter 10 is activated, optical multiplexing device 3 performs processing that establishes a circuit block within logic circuit 400 which includes switching means 401 and the like, based on the configuration data (refer to Step S21 in FIG. 10). Furthermore, when the configuration is completed, optical multiplexing device 3 starts to establish communication line 120 between optical multiplexing device 3 and optical multiplexing device 1 (Steps S22 and S23). Therefore, it takes a fixed period of time for the multiplexing communication system to get prepared before mounter 10 is activated and then is placed in a state where mounter 10 can start the mounting operation.

On the other hand, as mounter 10 is activated, amplification section 89 needs to check a state of a counter device (linear scale 151 or encoder 140). However, as described above, because it is difficult for mounter 10 to transfer data for a fixed period of time after being activated, when the multiplexing device such as optical multiplexing device 3, and amplification section 89 are activated at the same time, processing reports an error in state-checking communication from amplification section 89 to linear scale 151 or encoder 140. Thus, optical multiplexing device 3 according to the present embodiments achieves adjustment of an activation timing in cooperation with amplification section 89. Optical multiplexing device 3 determines the establishment of communication line 120 in Step S23 (refer to FIG. 10). Furthermore, controller 86 (processing section 422) is set not to activate amplification section 89 before receiving the multiplex internal state signal SI1 that optical multiplexing device 3 transmits after detecting the establishment of communication line 120 (Step S13). Accordingly, because communication line 120 is reliably established and then the communication to the counter linear scale 151 or the counter encoder 140 starts, amplification section 89 suitably performs transmission and reception of data without the occurrence of a defect such as a communication error.

Moreover, controller 86 (processing section 422) may be set to activate amplification section 89 after a delay time (which is hereinafter referred to as a "activation delay time") has elapsed from a point in time at which optical multiplexing devices 1 and 3 start to be activated, without performing the determination using the multiplex internal state signal SI1. As illustrated in FIG. 10, in a configuration at the time of the activation in Step S21, for example, it takes approximately 1 second (S) to complete the establishment of the circuit block. Furthermore, in processing for the communication establishment in Step S22, for example, it takes approximately 3 seconds (S) to establish communication line 120 to optical multiplexing devices 1, 3, and 5. Therefore, controller 86 activates amplification section 89 after, for example, the activation delay time of 5 seconds has elapsed from when the optical multiplexing device was activated, and thus it is possible to suitably perform the transmission and reception of the data between amplification section 89 and encoder 140. Furthermore, a configuration may be employed in which, without controller 86 checking whether the activation delay time has elapsed, optical multiplexing device 3 notifies controller 86 of a result of the checking.

(Mark Camera 49 and Optical Multiplexing Device 1 of Y-Axis Direction Slide Mechanism 52)

Next, one example of the connection between mark camera 49 and optical multiplexing device 1 is described.

As illustrated in FIG. 12, in addition to transmission data composition processing section 201 and reception data demultiplexing processing section 301, logic circuit 410 of optical multiplexing device 1 includes image processing section 501 that processes the image data IMGD which is output by imaging element 49A of mark camera 49 as a circuit block that is an FPGA. Moreover, FIG. 12 illustrates one portion of logic circuit 410. Imaging element 49A, for example, has an image element such as a CMOS, and a lens that forms an image of a photographic subject on the imaging element, and captures an image of circuit board 100 (refer to FIG. 2). Image processing section 501, for example, performs processing, such as determining of a pixel position of the image data IMGD that is input from imaging element 49A or extracting of an image area, and transmits a result of the processing to CPU 518. Image processing section 501, for example, transfers to CPU 518 the image data IMGD in the data format that complies with communication protocols for the digital interface (GigE-vision (a registered trademark) or the like) that is included in image board 91 (refer to FIG. 3). CPU 518 is a dedicated processor (an ARM core or the like) that is integrated into an FPGA. CPU 518, for example, performs arbitrary processing (for example, binarization) on the image data IMGD, and transfers a result of the processing to a network-for-control SLAVE processing IP 514 (which is hereinafter referred to as a "slave processing IP), which will be described below. Furthermore, for example, in a case where a defect occurs while an operation is in progress, and where controller 86 makes a request for pre-processing image data base on an instruction that is issued by an operator, CPU 518 transfers the image data IMGD as is, which is output from image processing section 501 to slave processing IP 514 without performing arbitrary processing on the image data IMGD. For example, controller 86 displays the image data IMGD on display device 13 (refer to FIG. 1) in order for the operator to check the image data IMGD. Furthermore, image processing section 501, for example, controls mark camera 49 according to a control signal (the parallel I/O signal PIOD) indicating starting of the image capture, changing of an image capture condition (gain), completing of the image capture, or the like, which is input from reception data demultiplexing processing section 301.

With this configuration, mark camera 49 does not need to include a circuit or the like that processes the image data IMGD of imaging element 49A. Furthermore, in optical multiplexing device 1, image processing section 501 that processes the image data IMGD that is output by imaging element 49A is configured as a circuit block of logic circuit 410 that performs the multiplexing processing. To be more precise, in optical multiplexing device 1, there is no need to add a processing circuit such as a hardware element in order to process the image data IMGD. Therefore, with this configuration, an image processing circuit at the mark camera 49 side can be removed, and image processing section 501 that performs equivalent processing is configured as a circuit block of logic circuit 410. Thus, a reduction in the number of components or a reduction in the manufacturing cost is achieved. Furthermore, with this configuration, because miniaturization of mark camera 49 or simplification of mark camera 49 is achieved, the freedom of selecting a position at which mark camera 49 is installed is improved. Moreover, image processing section 501, for example, may be configured from IP cores that pass a logical verification test, and a reduction in the manufacturing cost may be achieved. In this case, in one example of the connection that is illustrated in FIG. 12, image processing section 501 may be configured from IP cores that make it possible to output the image data IMGD that is output by imaging element 49A, using communication protocols (image transfer specifications) in accordance with the digital interface that is included in image board 91. Furthermore, as in one example of the connection that is illustrated in FIG. 3, with the configuration in which optical multiplexing device 1 and mark camera 49 are connected with GigE cable GigE that complies with GigE-vision (a registered trademark), image processing section 501 may be configured from IP cores that make it possible to output and also input the image data IMGD in the data format of the digital interface that complies with GigE-vision (a registered trademark).

(Processing Over the Control Network in Optical Multiplexing Device 1)

Furthermore, as illustrated in FIG. 12, logic circuit 410 includes MII interfaces (MII-I/Fs) 511 and 512, and a slave processing IP 514. The MII interfaces 511 and 512 and the slave processing IP 514, for example, are IP cores. Reception data demultiplexing processing section 301 demultiplexes various data such as the control data CTLD from the frame data FRMD that is received by optical module 242 through communication line 120, and performs error detection/correction processing. MII interfaces 511 and 512 are interfaces that connect a media access control (MAC) layer and a physical layer device (PHY) layer. MII interface 512 transfers data (the control data CTLD or the like) destined for the device to which the MII interface 512 belongs, which is input from reception data demultiplexing processing section 301, to the slave processing IP 514. Furthermore, the MII interface 512 transfers the control data CTLD that is processed by the slave processing IP 514, to transmission data composition processing section 201. Moreover, the MII interface 511 is a transfer interface, and is used as an interface through which the slave processing IP 514 transfers data to a different slave (slave 45 of optical multiplexing device 5 of head section 22, or the like).

The slave processing IP 514, for example, is an IP core at the slave side of the control network, such as MECHATROLINK (a registered trademark)-III, and transmits and receives signals of multiple elements, such as a sensor and an indication lamp, and the like, to and from a MASTER processing IP (an illustration of which is omitted) at the stationary section side (at the controller 86 side). Input and output section 519 performs fetching of data of various sensors or indication lamps or adjustment of an output timing. CPU 518 mediates a transfer destination of the control data CTLD that is transmitted and received between the slave processing IP 514 and input and output section 519, and performs real-time control that guarantees the time for high-speed processing of the control data CTLD. The slave processing IP 514 and CPU 518, for example, transmit and receive the control data CTLD through high-speed communication that complies with, for example, Ethernet (a registered trademark) (100 BASE-TX). Moreover, the slave processing IP 514 and CPU 518 correspond to slave 162 in FIG. 3. Furthermore, optical multiplexing device 1 is configured as illustrated in FIG. 12, that is, is configured to have slave 162 as one portion of logic circuit 410 that is an FPGA built into it.

Logic circuit 410 processes the control data CTLD, using the MII interfaces 511 and 512 and the slave processing IP 514 that are IP cores, which are included as an internal block in logic circuit 410. The slave processing IP 514, for example, outputs the control data CTLD that is output from a sensor or the like that is connected to input and output section 519 through the control network for high-speed communication, to the MII interface 512. Furthermore, the slave processing IP 514 inputs the control data CTLD that is transmitted from control board 94 of controller 86, into the MII interface 512, outputs an indication lamp (an illustration of which is omitted) that is included in Y-axis direction slide mechanism 52, and turns on the indication lamp or turns off the indication lamp. Accordingly, optical multiplexing device 1 does not need to add a processing circuit such as a hardware element for transferring the control data CTLD through the high-speed communication. As a result, with this configuration, an IP core of logic circuit 410 is used as a circuit that processes the control data CTLD, and thus it is possible to achieve large-scale integration, low cost, and space saving in comparison to a case where a specific-usage IC such as an application specific integrated circuit (ASIC) is used.

(Communication Between Amplification Section 89 and Linear Scale 151)

Next, communication between amplification section 89 and linear scale 151 of Y-axis direction slide mechanism 52 (refer to FIG. 3) is described. As illustrated in FIG. 13, optical multiplexing device 1 is connected to linear scale 151 through transmission and reception switching means 601 and protocol conversion means 604. Moreover, illustrations of devices that are included in optical multiplexing devices 1 and 3 are omitted in FIG. 13 for easy-to-understand description. In linear scale 151 according to the present embodiment, the linear scale signal LSD is transmitted and received through synchronous half-duplex communication with amplification section 89 (amplifier 132) through protocol conversion means 604. The synchronous communication, for example, is communication that complies with communication specifications for a high level data link control procedure (HDLC), and a speed of the synchronous communication is, for example, 8 Mbps. Furthermore, the synchronous communication is defined as communication through which data is transferred using a Manchester code that is robust to noise. In this case, the post-coding communication speed is 4 Mbps.

Linear scale 151 according to the present embodiment performs communication using a communication protocol different from a communication protocol (for example, HDLC) that is processed by amplifier 132. Protocol conversion means 604 converts input data and output data of linear scale 151 into input data and output data, receptively, for the synchronous communication that complies with the HDLC, and outputs a result of the conversion to transmission and reception switching means 601. Transmission and reception switching means 601 switches between transmission and reception during the half-duplex communication with protocol conversion means 604. In the same manner, transmission and reception switching means 602 that is included in optical multiplexing device 3 switches the transmission and the reception during the half-duplex communication over a communication line that is connected to amplification section 89. Moreover, transmission and reception switching means 601, transmission and reception switching means 602, and protocol conversion means 604, for example, are a circuit block that is an FPGA. In this case, transmission and reception switching means 601 and protocol conversion means 604 may be configured as a circuit block of logic circuit 410 that is illustrated in FIG. 9.

FIG. 14 illustrates one example of the half-duplex communication between amplification section 89 and linear scale 151. Each of amplification section 89 and linear scale 151 performs data transmission one time with a periodicity T1. The periodicity T1, for example, is 61 μs. Amplification section 89 transmits data DATA1 (the linear scale signal LSD) toward linear scale 151 with a periodicity T2. The periodicity T2, for example, is 30 μs. Amplification section 89 adds the starting flag S1 to a head portion of the data DATA1, and outputs the data DATA1 with the ending flag E1 being added to a tail portion of the data DATA1, to transmission and reception switching means 602. The starting flag S1 and the ending flag E1 are arbitrary bit values and, for example, are pieces of 8-bit data, for example, "01111110". Furthermore, amplification section 89 transmits dummy data D1 for establishing synchronization, before ending the data transfer with a previous periodicity and starting to transmit next data DATA1. The dummy data D1 is a bit value, for example, "1111 . . . " and is data that is successive bits with the same signal level (for example, the same high level). For the transmission of the data DATA1, the data DATA1 is divided by optical multiplexing device 3 (frame division section 222) into bit widths at bit positions that correspond to the frame data FRMD.

Furthermore, linear scale 151 transmits data DATA2 (the linear scale signal LSD) toward amplification section 89 with a periodicity T4 after the periodicity T2 ends and after a switch time T3 for transmission and reception elapses. The switch time T3, for example, is 1 μs. The periodicity T4, for example, is 30 μs. Moreover, data that is output from linear scale 151 is converted by protocol conversion means 604 (FIG. 13) described above into the data DATA2 that complies with the HDLC, and a starting flag S2 and an ending flag E2 are added to that data DATA2. The data (the data DATA2 or the like) that results from the conversion by protocol conversion means 604 is transferred toward optical multiplexing device 3 through transmission and reception switching means 601, and is output from transmission and reception switching means 602 of optical multiplexing device 3 to the amplification section 89. Furthermore, before starting to transmit the data (the DATA2 or the like) after the switch time T3 elapses, transmission and reception switching means 602 transmits dummy data D2 for establishing synchronization to amplification section 89.

In the half-duplex communication described above, transmission and reception switching means 602, for example, detects that the transmission has started depending on whether a bit of which a signal level changes from the dummy data D1 to the starting flag S1 (of which a bit value changes from "1" to "0") has fallen. Furthermore, transmission and reception switching means 602 detects that the transmission has ended depending on the number of times that a bit value "01111110" indicating the ending flags E1 and E2 is detected. For example, when it is detected that the bit has fallen, and then the bit value "01111110" is detected one time, that is, when the ending flag E1 is detected, transmission and reception switching means 602 switches between transmission and reception during communication with amplification section 89. Furthermore, at a point in time when it is detected that the bit has fallen and then the bit value "01111110" is detected three times (the ending flags E1 and E2 and the starting flag S2), that is, at a point in time when the ending flag E2 is detected, transmission and reception switching means 602 switches the transmission and the reception during the communication with amplification section 89. Accordingly, although the half-duplex communication is one that has a data structure (a communication specification) in which the data DATA1 and the data DATA2 have different bit widths, in transmission and reception switching means 602, it is possible to suitably detect the timing at which the switching takes place between the transmission and the reception. Moreover, transmission and reception switching means 601 performs the same processing as in transmission and reception switching means 602 on the input data and the output data of protocol conversion means 604, and thus it is possible to suitably detect the timing at which the switching takes place between the transmission and the reception.

Furthermore, as illustrated in FIG. 13, optical multiplexing device 1 includes buffer section 605 in which pieces of data DATA1 for the synchronous communication from amplification section 89 are accumulated at the receiving side. In the same manner, optical multiplexing device 3 includes buffer section 606 in which pieces of data DATA2 for the synchronous communication from linear scale 151 are accumulated at the receiving side. Buffer sections 605 and 606, for example, include first-in first-out (FIFO) type storage areas. At this point, in an example that is illustrated in FIG. 14, for pieces of data that are transmitted from amplification section 89 to linear scale 151 with the periodicity T2, bits from the staring flag S1 to the ending flag E1 need to be output from transmission and reception switching means 601 to protocol conversion means 604 in the receiving-side optical multiplexing device 1 in a state where the synchronization is established. However, as illustrated in FIG. 8, because the linear scale signal LSD (the data DATA1) is transmitted on a one-bit basis at a specific bit position of the frame data FRMD at an allocated clock, transmission is not seamlessly performed during communication from amplification section 89 to linear scale 151. To be more precise, in the data transfer from amplification section 89 to linear scale 151, the delay time occurs due to the multiplex communication in optical multiplexing devices 1 and 3. Because of this, in addition to the delay in the multiplex communication, there is a concern that synchronization deviation occurs due to a data error occurrence rate, jitters, and the like, in the data transfer by amplification section 89 and linear scale 151.

Thus, in optical multiplexing devices 1 and 3 according to the present embodiment, it is possible to establish the synchronous communication by providing buffer sections 605 and 606 in which the linear scale signals LSD are temporarily accumulated at the receiving side. For example, buffer section 605 is configured in such a manner that after an amount of data that is determined in advance is reached, for example, after the linear scale signals LSD for an amount of data with one-bit width (which corresponds to 2 bits that go through the Manchester coding) are accumulated, the transmission to transmission and reception switching means 601 starts. Moreover, a capacity of storage area of buffer section 605 is set by performing simulation based on a data transfer rate of the multiplex communication, a data output interval time at which the data DATA1 for the synchronous communication is output, or the like. The linear scale signals LSD that are transmitted from amplification section 89 and on which reception data demultiplexing processing section 301 (refer to FIG. 5) performs coding and error processing are temporarily accumulated in buffer section 605 and are output from buffer section 605 to transmission and reception switching means 601. Accordingly, transmission and reception switching means 601 allows the linear scale signal LSD to be transferred in a state where the delay time and the like due to the multiplex communication is removed by buffer section 605 and the synchronization is established. Therefore, optical multiplexing device 1 accumulates the linear scale signals LSD in buffer section 605, and outputs those linear scale signals LSD from transmission and reception switching means 601 to protocol conversion means 604. Thus, although delay and the like occur due to the data transfer during the multiplex communication, in optical multiplexing device 1, it is possible to perform the synchronous communication between amplification section 89 and protocol conversion means 604 (linear scale 151). In the same manner, optical multiplexing device 3 accumulates the linear scale signals LSD from protocol conversion means 604 in buffer section 606. Thus, in the optical multiplexing device, it is possible to perform the synchronous communication between amplification section 89 and protocol conversion means 604. Moreover, in mounter 10 according to the present embodiment, because an error correction method according to a type of data is able to be selected, it is possible to set error correction processing within a suitable processing time in order to prevent the synchronization deviation during the synchronous communication described above.

According to the present embodiment that is described above, the following effects are accomplished.

<Effect 1> In mounter 10 according to the present embodiment, transmission data composition processing section 201 performs the error processing in accordance with a type of data on each type of pieces of data (the image data IMGD, the control data CTLD, the encoder signal ENCD, the displacement sensor signal DISD, and the parallel I/O signal PIOD) that are different in the data transfer rate and the data processing time (the permitted delay time) from each other, and multiplexing section 219 multiplexes the resulting pieces of data into the frame data FRMD for transmission. Demultiplexing section 319 at the receiving side demultiplexes the frame data FRMD into individual pieces of data. Decoding correction processing section 311 and the like perform the error detection processing or the error detection/correction processing in accordance with the type of data on the individual pieces of data that result from the demultiplexing.

Accordingly, because setting processing for the error detection can be performed on each of the different types of data and the resulting data can be transmitted, if the resulting data is demultiplexed into individual pieces of data at the receiving side, suitable setting processing for the error detection or the error correction is performed on each of the individual pieces of data. Therefore, the error detection processing or the detection/correction processing, which is optimized, can be performed on pieces of data that are different types of data, based on the setting processing for the error detection or the error correction. Furthermore, in mounter 10, because the error processing cannot be performed on all pieces of frame data FRMD (the multiplexing data string), the error checking processing that is performed on all the pieces of frame data FRMD at the receiving side is unnecessary.

Furthermore, in addition to performing processing for the multiplex communication, optical multiplexing device 1 also functions as the electronic component mounting device in the related art. Specifically, for example, optical multiplexing device 1 performs processing that transmits a trigger signal TRIG to mark camera 49, as I/O control processing (refer to FIG. 3). Furthermore, for example, optical multiplexing device 1 performs processing that fetches the displacement sensor signal DISD which is output by circuit board height sensor 153, as sensor information fetching processing (refer to FIG. 9). Furthermore, for example, protocol conversion means 604 of optical multiplexing device 1 converts the input data and output data of linear scale 151 into the input data and output data, respectively, for the synchronous communication that complies with the HDLC, as communication protocol conversion processing (refer to FIG. 13). Furthermore, for example, optical multiplexing device 1 performs processing that fetches the image data IMGD which is output by imaging element 49A of mark camera 49, as image input processing (refer to FIG. 12). Furthermore, the slave processing IP 514 of optical multiplexing device 1 performs processing that transmits and receives signals of multiple elements such as a sensor and a display lamp, and the like, to and from the MASTER processing IP at the stationary section side (at the controller 86 side) (refer to FIG. 12). Electronic component mounting devices in the related art include a processing circuit for realizing this function separately from the communication device. However, in the optical multiplexing device (optical multiplexing device 1 or the like) according to the present embodiment, (the processing circuit), such as the FPGA or the CPU, that performs the multiplexing processing performs the processing described above as well, and thus it is possible to achieve the reduction in the cost of manufacturing optical multiplexing device 1 or the space saving. Moreover, optical multiplexing device 1 performs at least one type of processing as well among the I/O control processing operation, the sensor information fetching processing operation, the communication protocol conversion processing operation, the image input processing operation, and the slave communication processing operation, and thus the same effect as the effect described above can be obtained.

<Effect 2> Included in the frame data FRMD are the parallel I/O signal PIOD indicating the completion of the image capture that is performed by mark camera 49 or the like, the control data CTLD that is obtained by a sensor or the like that is connected to slaves 45 and 162, the linear scale signal LSD that is obtained by linear scale 151, and the like. Mounter 10 multiplexes those pieces of data that are necessary particularly for the mounting operation, and performs the error detection in accordance with the type of data, and thus both of the reduction in the number of communication lines relating to the connection between the devices and the suitable transfer of the data relating to the mounting operation are achieved.

<Effect 3> Controller 86 does not activate the amplification section 89 before receiving the multiplex internal state signal SI1 that optical multiplexing device 3 outputs after detecting the establishment of communication line 120 (refer to Step S13 in FIG. 10). Accordingly, because communication line 120 is reliably established and then the communication to counter encoder 140 for a state inquiry or the like starts, in amplification section 89, it is possible to start to suitably transmit and receive data without the occurrence of a defect such as the impossibility of state checking due to a communication error at the time of the activation.

<Effect 4> Buffer section 605 (refer to FIG. 13) in which the linear scale signals LSD are temporarily accumulated is provided on optical multiplexing device 1. Accordingly, optical multiplexing device 1 accumulates the linear scale signals LSD in buffer section 605, and then outputs those linear scale signals LSD to protocol conversion means 604. Thus, although the delay and the like occur due to the data transfer during the multiplex communication, it is possible to perform the synchronous communication between amplification section 89 and protocol conversion means 604 (linear scale 151).

<Effect 5> In the half-duplex communication between amplification section 89 and linear scale 151, transmission and reception switching means 601 (refer to FIG. 13) that is included in optical multiplexing device 1 detects that the communication has started depending on whether the bit of which the signal level changes from the dummy data D1 (refer to FIG. 14) to the starting flag S1 has fallen. Furthermore, transmission and reception switching means 601 detects that the transmission has ended depending on the number of times that the bit value indicating the ending flags E1 and E2 and the starting flag S2 is detected. Accordingly, although the half-duplex communication is one that has the data structure (the communication specification) in which the data DATA1 and the data DATA2 have different bit widths, in transmission and reception switching means 601, it is possible to suitably detect the timing at which the switching takes place between the transmission and the reception. Furthermore, transmission and reception switching means 601 can determine whether the transmission has started only depending on whether the bit has fallen without analyzing, determining, or the like of a bit value of the starting flag S1. Therefore, transmission and reception switching means 601 can be realized as a small-scale processing circuit. For example, the reduction in the cost of manufacturing optical multiplexing device 1 is possible by configuring transmission and reception switching means 601 as a circuit block that is an FPGA.

<Effect 6> Optical multiplexing device 1 includes protocol conversion means 604. Protocol conversion means 604 converts the input data and the output data of linear scale 151 that performs the data transfer using a communication protocol different from a communication protocol that is processed by amplification section 89 (amplifier 132), into input data and output data that are suitable for a communication protocol for amplification section 89. Accordingly, optical multiplexing device 1 changes a circuit block of protocol conversion means 604 according to a protocol for linear scale 151, and thus it is possible to connect between amplification section 89 and linear scale 151 that has a different protocol.

<Effect 7> Mounter 10 is configured in such a manner that cable 415 connecting between optical multiplexing device 3 and controller 86 is shared as a communication line not only through which the displacement sensor signal DISD is output, but also through which the signals SI1 and SI2 that indicate the communication establishment and the communication error, respectively, are output. Accordingly, because the reduction in the number of communication lines is achieved, the reduction in the cost of manufacturing optical multiplexing device 3 and also mounter 10 is achieved.

<Effect 8> Optical multiplexing device 1 has operational amplifier 411 and A/D conversion circuit 413, which process the displacement sensor signal DISD that is output by sensor element 153A (refer to FIG. 9), built into it, and thus the one-board configuration can be employed in which logic circuit 410 that performs the multiplexing processing, operational amplifier 411, and A/D conversion circuit 413 are mounted on a board. Accordingly, because the number of communication lines, the number of boards, and the like can be reduced, optical multiplexing device 1 can be configured in such a manner that a reduction in the cost of manufacturing mounter 10 is achieved.

<Effect 9-1> In optical multiplexing device 1 (refer to FIG. 12), image processing section 501 that processes the image data IMGD that is output by imaging element 49A of mark camera 49 is configured as a circuit block of logic circuit 410 that performs the multiplexing processing. Accordingly, logic circuit 410 performs the multiplexing processing and also functions as the camera, and thus in optical multiplexing device 1, there is no need to add a processing circuit such as a hardware element in order to process the image data IMGD. Therefore, with this configuration, an image processing circuit at the mark camera 49 side can be removed, and image processing section 501 that performs equivalent processing is configured as a circuit block of logic circuit 410. Thus, a reduction in the number of components and a reduction in the manufacturing cost is achieved. Furthermore, with this configuration, because miniaturization of mark camera 49 or simplification of mark camera 49 is achieved, the freedom of selecting a position at which mark camera 49 is installed is improved. Furthermore, image processing section 501 is configured from the IP cores, and thus the reduction in the manufacturing cost is possible.

<Effect 9-2> Logic circuit 410 processes the control data CTLD, using MII interfaces 511 and 512 and the slave processing IP 514 that are IP cores. With this configuration, the IP core of logic circuit 410 is used as a circuit that processes the control data CTLD, and thus it is possible to achieve the large-scale integration, the low cost, and the space saving in comparison to the case where a specific-usage IC such as an application specific integrated circuit (ASIC) is used.

Herein, electromagnetic motor 43 and linear motors 56 and 60 are one example of an electromagnetic motor. Parts camera 47 and mark camera 49 are one example of an imaging device. The encoder signal ENCD and the linear scale signal LSD are one example of an encoder signal. Amplification section 89 is one example of a drive control section. Communication lines 120 and 121 are one example of a communication line. External terminal 3A is one example of an external output terminal. FEC assignment sections 211 to 213 and frame division section 232 of transmission data composition processing section 201 are one example of error setting means. The frame data FRMD is one example of a multiplexing data string. Multiplexing section (MUX) 219 is one example of a multiplexing means. Demultiplexing section (DEMUX) 319 is one example of a restoration means. Furthermore, decoding correction processing sections 311 to 313, and multiple-times consistence detection section 334 are one example of error checking means. The image data IMGD, the control data CTLD, the encoder signal ENCD, the linear scale signal LSD, the displacement sensor signal DISD, and the parallel I/O signal PIOD are one example of different types of data. The linear scale signal LSD is one example of the encoder signal. The permitted delay time that is illustrated in FIG. 4 is one example of a data processing time. The signal indicating the completion of the image capture, which is output from parts camera 47 and mark camera 49 is one example of a detection signal that is output from a sensor element. Switching means 401 is one example of a switching section. The multiplex internal state signal SI1 is one example of an establishment signal. The multiplex abnormal signal SI2 is one example of an error signal. Logic circuit 410 is one example of a processing circuit. Operational amplifier 411 and A/D conversion circuit 413 are one example of an amplification section. Image processing section 501 is one example of an image processing means. MII interfaces 511 and 512 and the slave processing IP 514 are one example of an IP core. Transmission and reception switching means 601 and transmission and reception switching means 602 are one example of a transmission and reception switching means. Protocol conversion means 604 is one example of a protocol conversion means. Buffer sections 605 and 606 are one example of a buffer section. The processing in Step S24 that is illustrated in a flow in optical multiplexing device 3 in FIG. 10 constitutes a notifying means. Head section 22 is one example of the movable section. The electronic component is one example of a workpiece.

Moreover, the present disclosure is not limited to the embodiments described above. It goes without saying that various modifications and alterations are possible within the scope that does not depart from the gist of the present disclosure.

For example, according to the present embodiment, the multiplex communication through the optical fiber cable is described as an example, but the present application is not limited to this. The present embodiment can also be applied to multiplex communication through different wired communication (for example, a LAN cable, a USB cable, or the like) in the same manner, and can be applied to wireless communication as well as wired communication in the same manner. Moreover, in a case where each communication scheme is applied, a configuration of the frame data FRMD, a type of data that is multiplexed into the frame data FRMD, and the like are suitably changed. For example, according to the embodiment described above, the image data IMGD is included in the frame data FRMD, but the image data IMGD may be transferred through communication that is separated from the multiplex communication through which the frame data FRMD is transmitted. Alternatively, according to the embodiment described above, in mounter 10, the transfer of the data of each of the devices that are built into Y-axis direction slide mechanism 52 and head section 22, among the movable sections (X-axis direction slide mechanism 50, Y-axis direction slide mechanism 52, and head section 22) is performed by the multiplexing communication system, but the transfer of the data of the device that is included in any one of head section 22 and Y-axis direction slide mechanism 52, or X-axis direction slide mechanism 50 may be performed by the multiplexing communication system. Accordingly, mounter 10 can be configured to select whether the multiplexing communication system needs to transfer the data of each device of the movable section, according to the flexibility, the data transfer rate, or the like of the cable that connects between the stationary section (controller 86 of base 20) and the device that is included in the movable section.

(Frame Setting Means)

Furthermore, in mounter 10 according to the embodiment described above, head section 22 is attached to Y-axis slider 58 via a connector and is capable of being attached/detached with a single touch so as to change to a different type of head section or the like. Moreover, "being attachable and detachable" means that mounting and separation can be performed in an easy manner; for example, "being attachable and detachable" means that head section 22 can be replaced without any change to a state where mounter 10 is installed in a factory, and includes a state where installation and removal are possible with a single touch, and where replacement can be performed using a simple tool. If head section 22 is attachable and detachable, convenience of operating the mounter is improved such as performing maintenance in an easy manner.

For head section 22 that is attachable and detachable, transmission data composition processing section 201 of optical multiplexing device 5 may be configured in such a manner that a bit value of a bit position at which input data is not present (into which the encoder signal ENCD is not input), among bit positions at which the encoder signal ENCD of the frame data FRMD is set to be, is set for a non-processing target, according to the number of inputs of the encoder signal ENCD that is input from encoder 140 that head section 22 has. Specifically, as one example, the frame data FRMD is set to have only an 8-bit width that is allocated to the encoder signal ENCD. When head section 22 that is connected to Y-axis slider 58 is replaced, transmission data composition processing section 201 outputs a checking signal from a connection terminal and detects the number of encoders 140 that head section 22 which is newly connected has. Transmission data composition processing section 201, for example, detects that there are six encoders 140, which one of the external terminals encoders 140 are connected to, and so forth, from a response to the checking signal. Furthermore, transmission data composition processing section 201 sets data (for example, a bit value is always "0") indicating that a bit position is the non-processing target, to be in two bits in which input data is not present, that is, to two bits to which encoder 140 is connected, among 8 bits that correspond to the encoder signal ENCD of the frame data FRMD. With this configuration, even in a case where head section 22 is replaced with another head section 22 that has a small number of encoders 140, for example, a small number of electromagnetic motors 43 that change a position or the like of suction nozzle 41, the multiplex communication can be performed without changing the configuration or the like of the frame data FRMD.

Furthermore, the supply of electric power to electromagnetic motor 43 of head section 22 is not limited to a wired line such as power source line 141, and may be supplied in a non-contact electricity supply manner.

Furthermore, transmission data composition processing section 201 and reception data demultiplexing processing section 301 may perform the error processing on all pieces of the frame data FRMD.

Furthermore, logic circuit 400 that includes switching means 401 is not limited to a logic device, and may be configured as a dedicated processing circuit (an IC or the like).

Furthermore, input section 421, processing section 422, various boards (image board 91 and the like) that are included in controller 86 are limited to programs that run on the CPU, and may be configured in hardware.

Furthermore, the cable through which the signals SI1 and SI2 are output is not limited to cable 415 through which the displacement sensor signal DISD is output, and other communication lines may be used instead. Furthermore, cable 415 may be used for outputting any of the signals SI1 and SI2.

Other Embodiments

Next, mounter 700 according to another embodiment that is different from the embodiment described above is described.

Mounter 700 that is illustrated in FIG. 15 includes two mark cameras 702 and 703 in head section 701. Furthermore, in head section 701, for example, GigE terminals 704 and 705 that comply with the image transfer specifications for GigE-vision (a registered trademark) are built into an FPGA board that is equipped with multiplex communication FPGA 707 that performs the multiplex communication, as digital interfaces. Mark cameras 702 and 703 are connected in such a manner that the image data IMGD that results from the image capture is able to be output to multiplex communication FPGA 707 through GigE terminals 704 and 705 according to the image transfer specifications for GigE-vision (a registered trademark). Multiplex communication FPGA 707 multiplexes the image data IMGD that is output by each of the mark cameras 702 and 703, and transfers a result of the multiplexing to multiplex communication FPGA 721 that is included in multiplex communication board 720 at the stationary section through optical fiber cable 710. Multiplex communication board 720, for example, is connected to an extension slot of image processing board 722 that is included in controller 86 (refer to FIG. 3). Multiplex communication FPGA 721 demultiplexes the frame data FRMD that is transferred from multiplex communication FPGA 707, and transfers the image data IMGD to image processing board 722 through internal bus 723. As an interface of internal bus 723, for example, a serial transfer interface that complies with PCI Expresses can be employed. Iimage processing board 722 processes the image data IMGD that is transferred from multiplex communication FPGA 721. Moreover, multiplex communication FPGA 707 may include an IP core that makes it possible to input the image data IMGD according to the image transfer specifications for GigE-vision (a registered trademark). In this case, head section 701 may have a configuration in which multiplex communication FPGA 707 and mark cameras 702 and 703 are connected without involving GigE terminals 704 and 705. Furthermore, in a case where head section 701 includes devices other than mark cameras 702 and 703, for example, an electromagnetic motor and the like, multiplex communication FPGA 707 may be configured to multiplex the encoder signal ENCD in addition to the image data IMGD.

FIG. 17 illustrates mounter 800 as a comparative example.

Mounter 800 that is illustrated in FIG. 17 is different from mounter 700 that is illustrated in FIG. 15, in that multiplex device 820 which is provided separately from image processing board 822 at the stationary section side includes GigE terminals 824 and 825 that correspond to mark cameras 802 and 803, respectively. Mounter 800 is described in more detail as including two mark cameras 802 and 803 in head section 801. Mark cameras 802 and 803 are connected in such a manner that the image data IMGD that results from the image capture is able to be output to multiplex communication FPGA 807 through GigE terminals 804 and 805 according to the image transfer specifications for GigE-vision (a registered trademark). Multiplex communication FPGA 807 multiplexes the image data IMGD that is output by each of the mark cameras 802 and 803, and transfers a result of the multiplexing to multiplex communication FPGA 821 that is included in multiplex communication device 820 at the stationary section through optical fiber cable 810. GigE terminal 824 of multiplex device 820 is connected to a LAN board (not illustrated) of image processing board 822 through a GigE cable GigE1. Multiplex communication FPGA 821 transfers the image data IMGD that is obtained by mark camera 802, to image processing board 822 through GigE terminal 824 and GigE cable GigE1. In the same manner, multiplex communication FPGA 821 transfers the image data IMGD that is obtained by mark camera 803, to image processing board 822 through GigE terminal 825 and GigE cable GigE2.

Mounters 700 and 800 described above, for example, are configured in such a manner that head sections 701 and 801 are attachable and detachable and are changeable to ones of different types. Head sections 701 and 801 are different from each other in the number of machine-vision cameras that is mounted according to the type thereof or in communication protocol for the digital interface. For example, in some cases, mounter 700 includes multiple types of head sections 701 in order to perform suction/mounting according to a type of electronic component. FIG. 18 illustrates a configuration in which head section 801 of mounter 800 is changed to a different type of head section 831. Moreover, in FIG. 18, the same reference characters are given for the same configuration as that in FIG. 17. Head section 831 is equipped with mark camera 833 that transfers the image data IMGD according to image transfer specifications that are different from GigE-vision (a registered trademark), for example, according to image transfer specifications that comply with Cameralink specifications which use a low voltage differential signaling (LVDS) technology. In head section 831, camera link terminal 835 to which a camera link cable is able to be connected is provided on the FPGA board that is equipped with multiplex communication FPGA 837, and mark camera 833 is connected to camera link terminal 835.

In a case where head section 801 that is illustrated in FIG. 17 is changed to head section 831, mounter 800 needs to change a hardware configuration at the stationary section side. For example, multiplex device 820 is described in more detail as needing to be changed to one that includes camera link terminal 826 in a case where the digital interface to which the camera link cable is able to be connected is not included. Furthermore, image processing board 822 needs to connect image input board 840 that includes camera link terminal 842 to an extension slot, in the case where the digital interface to which the camera link cable is able to be connected is not included. Image input board 840, for example, is an extension board through which image input FPGA 841 is able to perform processing that transfers the image data IMGD which is input from camera link terminal 842 through internal bus 823, to image processing board 822. Then, camera link terminal 826 of multiplex device 820 and camera link terminal 842 of image input board 840 are connected to each other with a camera link cable CLC, and thus the image data IMGD that is obtained by mark camera 833 and which is transferred through the multiplex communication is transferred to image processing board 822. However, mounter 800 that is illustrated in FIGS. 17 and 18 is configured in such a manner that image processing board 822 and multiplex device 820 are connected to each other with a dedicated cable (the GigE cable GigE1 or GigE2, or the camera link cable CLC). A hardware configuration, such as wiring routing or connection to the extension board, needs to be changed according to communication protocols for cameras with which head sections 801 and 831 are equipped, respectively.

In contrast, FIG. 16 illustrates a configuration in which the same change as that in mounter 800 as a comparative example is made to mounter 700 according to the present embodiment, which is illustrated in FIG. 15. Mounter 700 is configured in such a manner that multiplex communication board 720 which includes multiplex communication FPGA 721 that performs the multiplex communication is connected to image processing board 722 through internal bus 723. The post-change mounter 700 that is illustrated in FIG. 16 is equipped with mark camera 733 that performs image transfer to head section 731, which complies with the Cameralink specifications. In mounter 700, multiplex communication FPGA 737 that is connected to optical fiber cable 710 multiplexes pieces of image data IMGD that are obtained by mark cameras 702 and 733, respectively, and transfers the result of the multiplexing to the multiplex communication FPGA 721.

Mark cameras 702 and 733 are connected to multiplex communication FPGA 737 through a digital interface with a different communication protocol. However, as is the case with the embodiment described above, multiplex communication FPGAs 721 and 737 multiplex multiple pieces of image data IMGD into the frame data FRMD, and transfers the result of the multiplexing. Furthermore, only image data is extracted by the data fetching section (refer to data fetching section 203 in FIG. 5) from pieces of image data IMGD that are input from GigE terminal 704 and camera link terminal 735 into multiplex communication FPGA 737, according to the communication protocol, and is multiplexed into the frame data FRMD. Therefore, for mounter 700, in head sections 701 and 731, a communication protocol for a digital interface for the machine vision camera is converted into a common protocol that is used from the multiplex communication, and thus even when the camera with which the head section is equipped is changed, the hardware configuration at the stationary section side does not need to be changed. Furthermore, for mounter 700, a circuit block of multiplex communication FPGA 721 that is included in multiplex communication board 720 is changed according to changing of the head sections 701 and 731, and thus the head section can be easily replaced without performing an operation such as wiring routing. Moreover, the configuration of mounter 700 is one example, and can be suitably changed. For example, mounter 700 is configured in such a manner that pieces of image data IMGD that are different in communication protocol are targets, but may be configured in such a manner that other pieces of data such as the encoder signal ENCD are processing targets. With this configuration, mounter 700 can be configured in such a manner that head sections that are equipped with encoders that are different in communication protocol are able to be changed easily. Furthermore, multiplex communication FPGAs 707, 721, and 737 may be configured in such a manner that the error checking processing is not performed on the data that results from the multiplexing, such as the image data IMGD.

Furthermore, according to the embodiment described above, electronic component mounting device 10 that mounts electronic components onto a circuit board is described, but the present application is not limited to this, and can be applied to a machine for performing an operation on a circuit board, such as a screen printing device. Furthermore, the present application may be applied to a work robot that performs an assembly operation such as one for a secondary battery (a solar cell, a fuel cell, or the like).

Next, technical ideas that are derived from the embodiments described above are described.

(A) A multiplexing communication system according to claim 1 that does not perform the error processing on the multiplex data string.

With this configuration, because the error processing is not performed on the multiplex data string, the processing time for performing the detection/correction of the error on the multiplex data string at the receiving side is not necessary. Accordingly, because pieces of data that belong to multiple types of data are mixed and timings at which pieces of data are requested are also different from each other, all pieces of data do not need to wait in the same way for the processing time to complete the error detection/correction processing on all the multiplex data strings. It is convenient that the error processing is performed on each of the individual pieces of data whenever necessary and thus a result of the error processing can be provided for processing or control.

(B) The multiplexing communication system according to claim 1 or (A) described above, in which according to a data request rate for each of the multiple types of data, which is determined according to the data transfer rate and the data processing time, error processing that is performed on each of the multiple pieces of data in the error setting means and the error checking means is determined and frequency of arrangement of the data in the multiplex data string that results from multiplexing in the multiplexing means is determined.

With this configuration, the error processing is determined according to the data request rate that is determined according to the data transfer rate and the data processing time. Furthermore, the frequency of the arrangement in the multiplex data string is determined according to the data request rate. Because, whenever necessary, the error processing is performed on each piece of data and the frequency of the arrangement is determined, the data transfer can be performed on each piece of data with high efficiency.

(C) The multiplexing communication system according to (B) described above, in which, according to the data request rate, the error processing that is performed in the error setting means and the error checking means corresponds to either of the forward error correction processing and processing a data update condition for which the same value is acquired when the data is transferred multiple times.

With this configuration, according to the data request rate, either of (1) the forward error correction processing and (2) the processing of the data update condition for which the same data value is acquired when the data is transferred multiple times is selected for the data error processing.

The forward error correction processing (1) is performed on data of which re-transmission is limited due to a restriction on the data request rate and the like. Processing in which erroneous data is corrected and restored at the receiving side is performed. A Reed-Solomon code, a Hamming code, or the like is used. The error correction processing (1) is suitable error processing that is performed on a large amount of image data and the like which are difficult to re-transmit due to the restriction on the data transfer rate.

The processing (2) is processing that is performed in a case where it is confirmed that the same data is transferred multiple times. The processing (2) is performed on data that is either smaller in amount or is lower in data request rate than in the case of the processing (1). It is effective in individual transfer to assign a parity check code or the like and thus to secure the ability to detect the data error. The processing (2) is effective processing that is performed on data on which processing needs to be performed after it is confirmed that data values are consistent with each other when the transfer is performed multiple times. For example, the processing (2) is performed on I/O signals such as signals for controlling parts camera 47 and mark camera 49.

(D) A transmission device that is provided included in a multiplexing communication system which multiplexes multiple pieces of data that belong to multiple types of data which are different from one another in a stipulated data transfer rate and a data processing time that is required, and performs wired communication, the transmission device including: an error setting means for performing setting processing for error detection in accordance with the data transfer rate and the data processing time, on each of the multiple pieces of data, and a multiplexing means for multiplexing the multiple pieces of data on which the setting processing for the error detection is performed by the error setting means, into a multiplex data string, in which, at the receiving side, the multiplex data string is restored and then error detection processing or error detection/correction processing in accordance with the setting processing is performed by the error setting means on the multiple pieces of data that are restored.

(E) A reception device that is provided included in a multiplexing communication system which multiplexes multiple pieces of data that belong to multiple types of data which are different from one another in a stipulated data transfer rate and a data processing time that is required, and performs wired communication, the reception device including: a restoration means for restoring the multiple pieces of data from a multiplex data string that results from multiplexing at the transmitting side; and an error checking means for performing error detection processing or error detection/correction processing on each of the multiple pieces of data that are restored, based on setting processing for error detection that is performed at the transmitting side according to the data transfer rate and the data processing time.

The multiplexing communication system in the present application can be configured from the transmission device (D) and the reception device (E) with these configurations. Suitable error processing can be performed on each of the pieces of data that belong to different types of data, and the multiple pieces of data can be efficiently multiplexed and transferred.

(F) A processing device includes multiple devices that perform data processing at a stipulated data transfer rate and at a specific data processing time that is required, an error setting means for performing setting processing for error detection in accordance with the data transfer rate and the data processing time for each of the multiple devices, on data that is transferred from each of the multiple devices, and a multiplex transmission means that multiplexes the multiple pieces of data on which the setting processing for the error detection is performed by the error setting means, and transmits a result of the multiplexing.

With this configuration, the error setting means performs the setting processing for the data error detection for each device on the multiple devices each of which performs data processing that transfers data at the specific data transfer rate and at the data processing time, and then pieces of data are multiplexed. Accordingly, in a case where pieces of data that are different for different devices are mixed and communicated, the error processing suitable for data for different devices can be performed.

REFERENCE SIGNS LIST

1, 3, 5: optical multiplexing device, 10: electronic component mounting device, 89: amplification section, 201: transmission data composition processing section, 211 to 213: FEC assignment section, 219: multiplexing section, 301: reception data demultiplexing processing section, 319: demultiplexing section, 311 to 313: decoding correction processing section, 334: multiple-times consistence detection section, 120, 121: communication line, 401: switching means, 410: logic circuit, 411: operational amplifier, 413: A/D conversion amplifier, 501: image processing section, 511, 512: MII interface, 514: slave processing IP, 601, 602: transmission and reception switching means, 604: protocol conversion means, 605, 606: buffer section

The invention claimed is:

1. A multiplexing communication system that multiplexes multiple data which belong to multiple types of data which have a different stipulated data transfer rate and required data processing time and that performs communication through wired communication, the system comprising:
a transmitting side that includes:
error setting circuitry configured to perform setting processing for error detection in accordance with the data transfer rate and the data processing time on each of the multiple data, and
a multiplexing circuitry configured to multiplex the multiple pieces of data on which the setting processing for the error detection is performed into a multiplex data string; and
a receiving side that includes:
restoration circuitry configured to restore the multiple data from the multiplex data string, and
error checking circuitry configured to perform error detection processing or error detection/correction processing in accordance with the setting processing on each of the multiple data that are restored,
wherein at least one of the transmitting side and the receiving side includes a processing circuit that is configured to perform at least one type of processing operation among I/O control processing, sensor information fetching processing, communication protocol conversion processing, image input processing that fetches an output of an image element, and communication processing by a slave on a control network,
wherein at least one of the processing circuit of the transmitting side is configured to function as the multiplexing circuitry and the processing circuit of the receiving side is configured to function as the restoration circuitry,
wherein the multiple data includes a detection signal that is output from a sensor and an encoder signal that is output from an encoder which detects displacement of an electromagnetic motor,
wherein the receiving side includes notifying circuitry configured to notify a drive control circuitry that drive-controls the electromagnetic motor according to the encoder signal of an activation timing at which the drive control circuitry is activated based on detection of a state where an activation delay time, which is a delay time set to start from a point in time when the multiplexing circuitry and the restoration circuitry are activated, has elapsed.

2. The multiplexing communication system according to claim 1,
wherein the notifying circuitry is configured to notify the drive control circuitry of the activation timing based on detection of a state where a communication line between the multiplexing circuitry and the restoration circuitry is established through the wired communication.

3. The multiplexing communication system according to claim 1,
wherein the encoder is configured to output the encoder signal at the data transfer rate using synchronous communication, and
wherein the receiving side includes a buffer, in which encoder signals that are restored by the restoration circuitry from the multiplex data string are accumulated by an amount of data that is set in advance in accordance with a data transfer rate in the wired communication and a data output interval time in the synchronous communication, from which the accumulated encoder signals are output to the drive control circuitry through the synchronous communication.

4. The multiplexing communication system according to claim 1,
wherein the encoder is configured to output the encoder signal at the data transfer rate through half-duplex communication, wherein the receiving side and the transmitting side include a transmission and reception switching circuitry for processing switching between transmission and reception during the half-duplex communication, and wherein the transmission and reception switching circuitry is configured to detect that a transmission starts depending on whether a head bit of data that is transferred through the half-duplex communication rises or falls and thus perform the switching, and detect that the transmission ends depending on the number of times that an ending flag that is set in advance is detected and thus perform the switching.

5. The multiplexing communication system according to claim 1, wherein the drive control circuitry and the encoder have different communication protocol from each other, and wherein, as the communication protocol conversion processing, the processing circuit is configured to convert the encoder signal that is output by the encoder in a format of the communication protocol for the encoder, into a format of the communication format for the drive control circuitry.

6. The multiplexing communication system according to claim 1, wherein the wired communication is a communication in which the multiplex data string is transferred through at least one communication medium of an optical fiber cable and a LAN cable.

7. The multiplexing communication system according to claim 1, wherein the receiving side includes an external output terminal configured to output at least one piece of output data, among the multiple data that are restored from the multiplex data string, to an external device, and switching circuitry configured to switch an output of the external output terminal to the output data and different data, and wherein the switching circuitry is configured to perform switching in such a manner that at least one signal of an establishment signal for establishment of the communication line between the multiplexing circuitry and the restoration circuitry through the wired communication and an error signal is output, as the different data, from the external output terminal to the external device.

8. The multiplexing communication system according to claim 1, wherein the transmitting side includes an amplification section that is built into a multiplexing device that has the multiplexing circuitry, and wherein the amplification section is configured to amplify an output of a height sensor which measures a height of a target object.

9. The multiplexing communication system according to claim 1, wherein the processing circuit includes an IP core that is a programmable logic device into which a circuit is built based on configuration information, that is a digital interface of an imaging device that includes the imaging element or is a digital interface of an image board that processes an output of the imaging element, and that inputs or outputs the output of the imaging element in a data format of communication protocol for the digital interface.

10. The multiplexing communication system according to claim 1, wherein, in the multiplex data string, encoder signals are bit-allocated at multiple bit positions that correspond to multiple encoder signals, respectively, and wherein the transmission side includes frame setting circuitry configured to set a bit value of the bit position which corresponds to a position into which the encoder signal is not input, for a non-processing target, among the multiple bit positions, in a case where a bit width of the bit position in which the bit-allocation takes place is greater in comparison to the number of inputs of the encoder signal.

11. The multiplexing communication system according to claim 10, wherein a movable section that includes the electromagnetic motor and the encoder and is detachably connected to the multiplexing communication system, and wherein the frame setting circuitry sets a bit value of the excessive bit position for the non-processing target according to the number of the inputs of the encoder signal that are input from the encoder which is included in the movable section connected to the multiplexing communication system.

12. A substrate working machine, comprising:

a movable section configured to hold a workpiece, wherein the substrate working machine is configured to perform a mounting operation with the workpiece, and wherein data concerning the mounting operation is transferred by the multiplexing communication system according to claim 1.

13. The substrate working machine according to claim 12, further comprising a stationary section, wherein the movable section includes the electromagnetic motor and the encoder that detects displacement of the electromagnetic motor, and wherein the drive control circuitry that receives the encoder signal, which is output from the encoder and is transferred through the wired communication in the multiplexing communication system, is included in the stationary section.

14. The substrate working machine, according to claim 13, wherein electric power that is supplied from the drive control circuitry to the electromagnetic motor of the movable section is supplied through a power source line that is provided separately from the wired communication in the multiplexing communication system.

15. The substrate working machine, according to claim 13, comprising:

a first moving mechanism configured to move the movable section to the stationary section in a first direction; and a second moving mechanism configured to move the movable section and the first moving mechanism in a second direction that intersects the first direction, wherein the multiplexing communication system transfers only data concerning the movable section and the first moving mechanism.

16. The multiplexing communication system according to claim 1, wherein the multiple data include image data that are output by multiple imaging devices which have a different communication protocol for a digital interface, wherein, at the transmitting side, the multiplexing circuitry is configured to multiplex the image data that are output by the multiple imaging devices that have a different communication protocol into the common multiplex data string, and wherein, at the receiving side, the image data that is restored from the multiplex data string is output through a common internal bus through which data is transferred using a communication protocol that is different from that for the digital interface.

17. A substrate working machine, comprising:

a movable section configured to hold a workpiece, wherein the substrate working machine is configured to perform a mounting operation with the workpiece, wherein data concerning the mounting operation is transferred by the multiplexing communication system according to claim 16, and wherein the multiplexing circuitry is provided on the movable section.

* * * * *